US012555069B2

(12) United States Patent
Ohlsson et al.

(10) Patent No.: US 12,555,069 B2
(45) Date of Patent: Feb. 17, 2026

(54) SYSTEMS AND METHODS FOR INVENTORY MANAGEMENT AND OPTIMIZATION

(71) Applicant: C3.ai, Inc., Redwood City, CA (US)

(72) Inventors: Henrik Ohlsson, Palo Alto, CA (US); Gowtham Bellala, Redwood City, CA (US); Sina Khoshfetratpakazad, Redwood City, CA (US); Dibyajyoti Banerjee, Santa Clara, CA (US); Nikhil Krishnan, San Carlos, CA (US)

(73) Assignee: C3.ai, Inc., Redwood City, CA (US)

( * ) Notice: Subject to any disclaimer, the term of this patent is extended or adjusted under 35 U.S.C. 154(b) by 474 days.

(21) Appl. No.: 17/244,817

(22) Filed: Apr. 29, 2021

(65) Prior Publication Data
US 2021/0390498 A1    Dec. 16, 2021

Related U.S. Application Data

(63) Continuation of application No. PCT/US2019/059269, filed on Oct. 31, 2019, which
(Continued)

(51) Int. Cl.
*G06N 20/00* (2019.01)
*G06Q 10/0631* (2023.01)
(Continued)

(52) U.S. Cl.
CPC .......... *G06Q 10/087* (2013.01); *G06N 20/00* (2019.01); *G06Q 10/06315* (2013.01); *G06Q 10/067* (2013.01)

(58) Field of Classification Search
CPC .............. G06Q 10/087; G06Q 20/203; G06Q 10/0631; G06Q 10/06375;
(Continued)

(56) References Cited

U.S. PATENT DOCUMENTS

| 5,287,267 A | 2/1994 | Jayaraman et al. |
| 5,946,662 A * | 8/1999 | Ettl ...................... G06Q 20/203 705/22 |

(Continued)

FOREIGN PATENT DOCUMENTS

| CN | 105139090 A | 12/2015 |
| CN | 105981059 A | 9/2016 |

(Continued)

OTHER PUBLICATIONS

Agarwal. Multi-echelon Supply Chain Inventory Planning using Simulation-Optimization with Data Resampling (Jan. 1, 2019). Retrieved Jul. 6, 2022 from URL: https://arxiv.org/pdf/1901.00090. 22 pages.
(Continued)

*Primary Examiner* — Florian M Zeender
*Assistant Examiner* — Milena Racic
(74) *Attorney, Agent, or Firm* — Nicholson De Vos Webster & Elliott LLP

(57) ABSTRACT

The present disclosure provides systems and methods that may advantageously apply machine learning to accurately manage and predict inventory variables with future uncertainty. In an aspect, the present disclosure provides a system that can receive an inventory dataset comprising a plurality of inventory variables that indicate at least historical (i) inventory levels, (ii) inventory holding costs, (iii) supplier orders, or (iv) lead times over time. The plurality of inventory variables can be characterized by having one or more future uncertainty levels. The system can process the inventory dataset using a trained machine learning model to generate a prediction of the plurality inventory variables. The system can provide the processed inventory dataset to an optimization algorithm. The optimization algorithm can predict one or more inventory management parameters that
(Continued)

result in a particular probability of achieving a target service level while minimizing a cost. The optimization algorithm can comprise constraint conditions.

34 Claims, 7 Drawing Sheets

Related U.S. Application Data is a continuation-in-part of application No. 16/506,672, filed on Jul. 9, 2019, now Pat. No. 11,620,612.

(60) Provisional application No. 62/754,466, filed on Nov. 1, 2018.

(51) Int. Cl.
 *G06Q 10/067* (2023.01)
 *G06Q 10/087* (2023.01)

(58) Field of Classification Search
 CPC .......... G06Q 10/06312; G06Q 10/067; G06Q 10/06315; G06N 20/00; G06N 3/00; G06N 3/08; G06N 20/10; G06N 20/20; G06N 5/01; G06N 7/01; G06N 3/09
 See application file for complete search history.

(56) References Cited

U.S. PATENT DOCUMENTS

| | | |
|---|---|---|
| 6,970,841 B1 | 11/2005 | Cheng et al. |
| 7,117,130 B1 | 10/2006 | Megiddo |
| 7,398,232 B2 | 7/2008 | Renz et al. |
| 7,499,766 B2* | 3/2009 | Knight ................. G06Q 10/087 700/107 |
| 8,428,985 B1 | 4/2013 | Puskorius et al. |
| 9,978,026 B1 | 5/2018 | Konanur et al. |
| 10,445,689 B2* | 10/2019 | Feng ................. G06Q 10/06315 |
| 10,474,959 B2* | 11/2019 | Hunt ..................... G06N 7/01 |
| 10,512,173 B1 | 12/2019 | Hiwatashi et al. |
| 10,783,462 B1* | 9/2020 | Mo ..................... G06Q 10/047 |
| 11,176,589 B2 | 11/2021 | Pyati |
| 11,321,650 B2 | 5/2022 | Anandan et al. |
| 11,620,612 B2 | 4/2023 | Ohlsson et al. |
| 11,810,044 B1 | 11/2023 | Singh et al. |
| 11,916,994 B1 | 2/2024 | Dobrinin |
| 11,917,243 B1* | 2/2024 | Moraghan .......... H04N 21/4532 |
| 12,140,920 B2* | 11/2024 | Cella ................... G05B 19/042 |
| 12,258,169 B2* | 3/2025 | Van De Hey .......... B65B 25/00 |
| 2002/0169657 A1* | 11/2002 | Singh ..................... G06Q 10/06 705/7.31 |
| 2003/0126103 A1 | 7/2003 | Chen et al. |
| 2003/0225635 A1 | 12/2003 | Renz et al. |
| 2004/0153187 A1 | 8/2004 | Knight et al. |
| 2005/0004833 A1 | 1/2005 | McRae et al. |
| 2006/0235557 A1 | 10/2006 | Knight et al. |
| 2010/0114554 A1 | 5/2010 | Misra |
| 2013/0226848 A1 | 8/2013 | Cantin |
| 2014/0031966 A1 | 1/2014 | Cheng et al. |
| 2014/0122178 A1 | 5/2014 | Knight et al. |
| 2014/0344193 A1 | 11/2014 | Bilenko et al. |
| 2015/0134397 A1* | 5/2015 | Dogan ................. G06Q 10/063 705/7.25 |
| 2015/0254589 A1 | 9/2015 | Saxena et al. |
| 2016/0328734 A1 | 11/2016 | Lederman et al. |
| 2016/0364684 A1 | 12/2016 | Nanda et al. |
| 2017/0185933 A1 | 6/2017 | Adulyasak et al. |
| 2017/0330123 A1 | 11/2017 | Deshpande et al. |
| 2018/0012166 A1 | 1/2018 | Devadas et al. |
| 2018/0240041 A1 | 8/2018 | Koch et al. |
| 2018/0268330 A1 | 9/2018 | Konanur et al. |
| 2018/0285772 A1* | 10/2018 | Gopalan .................. G06N 7/01 |
| 2018/0285902 A1 | 10/2018 | Nazarian et al. |
| 2018/0308039 A1* | 10/2018 | Nemati ................ G06Q 30/0202 |
| 2019/0080277 A1 | 3/2019 | Trivelpiece et al. |
| 2019/0188536 A1 | 6/2019 | Lei et al. |
| 2020/0034701 A1* | 1/2020 | Ritter .................... G06F 9/5005 |
| 2020/0074401 A1* | 3/2020 | Oliveira Almeida ........ G06F 18/2321 |
| 2020/0143313 A1 | 5/2020 | Ohlsson et al. |
| 2020/0184494 A1* | 6/2020 | Joseph ................. G06F 18/214 |
| 2020/0210947 A1 | 7/2020 | Devarakonda et al. |
| 2021/0390498 A1 | 12/2021 | Ohlsson et al. |
| 2022/0027817 A1 | 1/2022 | Hubbs et al. |
| 2023/0376761 A1* | 11/2023 | Mcinerney ............... G06N 7/01 |

FOREIGN PATENT DOCUMENTS

| | | |
|---|---|---|
| CN | 106651258 A | 5/2017 |
| CN | 107563705 A | 1/2018 |
| JP | 2006503352 A | 1/2006 |
| JP | 2007226718 A | 9/2007 |
| JP | 2009042810 A | 2/2009 |
| KR | 20130107369 A | 10/2013 |
| WO | WO-2014097011 A1 | 6/2014 |
| WO | WO-2020092846 A1 | 5/2020 |

OTHER PUBLICATIONS

Aikins. Facility location models for distribution planning. European Journal of Operational Research 22 (1985) 263-279.
Chu et al. Simulation-based optimization framework for multi-echelon inventory systems under uncertainty. Computers and Chemical Engineering 73 (2015) 1-16. Available online Oct. 31, 2014.
EP19880403.1 Extended European Search Report dated Mar. 18, 2022.
Fu. Optimization for simulation: Theory vs. Practice. Informs Journal on Computing, vol. 14, No. 3, pp. 192-215 (2002).
Garcia et al. Model predictive control: Theory and practice—A survey. Automatica, vol. 25, No. 3, pp. 335-348 (1989).
Geoffrian et al. Multicommodity Distribution System Design by Benders Decomposition, pp. 35-61 (2010). In Sodhi et al., eds. A Long View of Research and Practice in Operations Research and Management Science. International Series in Operations Research & Management Science, vol. 148. Springer, Boston, MA.
Geoffrian et al. Twenty Years of Strategic Distribution System Design: An Evolutionary Perspective. Interfaces 25:105-107 (1995).
Gupta et al. A Two-Stage Modeling and Solution Framework for Multisite Midterm Planning under Demand Uncertainty. Ind. Eng. Chem. Res. 2000, 39, 10, 3799-3813.
Ierapetritou et al. Novel Optimization Approach of Stochastic Planning Models. Ind. Eng. Chem. Res. 1994, 33, 8, 1930-1942.
Joines et al. Supply chain multi-objective simulation optimization. Proceedings of the 2002 Winter Simulation Conference, pp. 1306-1314 (2002).
Jung et al. Integrated safety stock management for multi-stage supply chains under production capacity constraints. Computers and Chemical Engineering 32 (2008) 2570-2581. Available online Apr. 23, 2008.
Köchel et al. Simulation-based optimisation of multi-echelon inventory systems. Int. J. Production Economics 93-94 (2005) 505-513.
Mayne et al. Constrained model predictive control: Stability and optimality. Automatica 36 (2000) 789-814.
Mele et al. A Simulation-Based Optimization Framework for Parameter Optimization of Supply-Chain Networks. Ind. Eng. Chem. Res. 2006, 45, 3133-3148.
Olafsson et al. Simulation optimization. Proceedings of the 2002 Winter Simulation Conference, vol. 1, pp. 79-84 (2002).
PCT/US2019/059269 International Preliminary Report on Patentability dated Apr. 27, 2021.
Ptak et al. Orlicky's material requirements planning, pp. 83-113, McGraw-Hill (2011).
Santoso et al. A stochastic programming approach for supply chain network design under uncertainty. European Journal of Operational Research, 167 (2005) 96-115. Available online May 18, 2004.
Silver et al. A heuristic for selecting lot size quantities for the case of a deterministic time-varying demand rate and discrete opportunities for replenishment. Prod. Inventory Manage., vol. 14, No. 2, pp. 64-74 (1973).

(56) References Cited

OTHER PUBLICATIONS

Smith et al. Demand driven performance: using smart metrics, p. xxiii, McGraw-Hill Education (2014).
Swaminathan et al. Modeling Supply Chain Dynamics: A Multiagent Approach. Decision Sciences, vol. 29, No. 3, pp. 607-632 (Summer 1998).
U.S. Appl. No. 16/506,672 Office Action dated May 27, 2022.
U.S. Appl. No. 16/506,672 Office Action dated Nov. 16, 2021.
Velasco Acosta et al. Applicability of Demand-Driven MRP in a complex manufacturing environment. International Journal of Production Research, vol. 58, 2020—Issue 14, pp. 4233-4245.
Vidal et al. Strategic production-distribution models: A critical review with emphasis on global supply chain models. European Journal of Operational Research 98 (1997) 1-18.
Wagner et al. Dynamic version of the economic lot size model. Management Science, vol. 5, No. 1, pp. 89-96 (Oct. 1958).
European Patent Office, Communication Pursuant to Article 94(3) EPC issued in European Patent Application No. 19880403.1, dated Dec. 22, 2022, 8 pages.
Wikipedia: "Inventory optimization," Internet Article, Feb. 6, 2018 (Feb. 6, 2018), Retrieved from the Internet: https://en.wikipedia.org/w/index.php?title=Inventory_optimization&oldid=824361368 [retrieved on Dec. 16, 2022], 5 pages.
Ettl et al. A Supply Network Model with Base-Stock Control and Service Requirements. Operations Research 48(2):216-232 (Mar.-Apr. 2000). DOI: https://doi.org/10.1287/opre.48.2.216.12376.
PCT/US2019/059269 International Search Report and Written Opinion dated Jan. 31, 2020.
Tsiakis et al. Design of Multi-echelon Supply Chain Networks under Demand Uncertainty. Ind Eng Chem Res 40:3585-3604 (2001).
U.S. Appl. No. 16/506,672 Office Action dated Nov. 18, 2019.
U.S. Appl. No. 16/506,672 Office Action dated Mar. 8, 2021.
U.S. Appl. No. 16/506,672 Office Action dated May 28, 2020.
Mousavi, Optimizing a location allocation-inventory problem in a two-echelon supply chain network, Jun. 11, 2015, Computers and Industrical Engineering 87 (2015) 543-560. (Year: 2015).
U.S. Appl. No. 16/506,672 Notice of Allowance dated Nov. 30, 2022, 11 pages.
Klose et al. "Facility Location Models for Distribution System Design," European Journal of Operational Research, Oct. 2003, 26 pages.
Alharkan et al. "Simulation-Based Optimization of a Two-Echelon Continuous Review Inventory Model with Lot Size-Dependent Lead Time," Processes, Aug. 2020, 15 pages.
Chu et al. "Simulation-Based Optimization for Multi-Echelon Inventory Systems Under Uncertainty," Proceedings of the 2014 Winter Simulation Conference, 2014, 10 pages.
China National Intellectual Property Administration, First Office Action issued for Chinese Patent Application No. 201980087611.5, dated Jun. 25, 2023, 12 pages.
European Patent Office, Communication Pursuant to Article 94(3) EPC issued for European Patent Application No. 19880403.1, dated Jun. 19, 2023, 9 pages.
Chen, C.-L. et al. "Multi-Objective Optimization of Multi-Echelon Supply Chain Networks with Uncertain Product Demands and Prices," Computers and Chemical Engineering, vol. 28, 2004, 14 pages.
Japanese Patent Office, Official Action issued in Japanese Patent Application No. 2021-523893, dated Sep. 28, 2023, 5 pages.
Australian Government, IP Australia, Examination report issued for Australian Patent Application No. 2019374101, dated May 31, 2024, 6 pages.
Gong, Y. et al. "A Review on Stochastic Models and Analysis of Warehouse Operations," Logist. Res., (2011), vol. 3, pp. 191-205, 15 pages.
Rossi, R. et al. "A Global Chance-Constraint for Stochastic Inventory Systems Under Service Level Constraints," Constraints, vol. 13, (2008), pp. 490-517, 28 pages.
Walsh, T. "Stochastic Constraint Programming," Proceedings of the 15th European Conference on Artificial Intelligence, Mar. 6, 2009, https://doi.org/10.48550/arXiv.0903.1152, 5 pages.
Patent Cooperation Treaty, International Search Report and Written Opinion issued for PCT Application No. PCT/US2022/076565, dated Dec. 8, 2022, 12 pages.
Patent Cooperation Treaty, International Preliminary Report on Patentability issued for PCT Application No. PCT/US2022/076565, dated Mar. 5, 2024, 7 pages.
Dreossi et al. "VERIFAI: A Toolkit for the Design and Analysis of Artificial Intelligence-Based Systems," arXiv: 1902.04245, Feb. 2019, 10 pages.
Lambert et al. "The Importance of Hyperparameter Optimization for Model-based Reinforcement Learning," Berkeley Artificial Intelligence Research, Apr. 2021, https://bair.berkeley.edu/blog/2021/04/19/mbrl/, 6 pages.
Australian Government, IP Australia, Examination report issued for Australian Patent Application No. 2019374101, dated Sep. 20, 2024, 6 pages.
Fu, M. C. (2013). "Perturbation Analysis". In: Gass, S. I., Fu, M. C. (eds) Encyclopedia of Operations Research and Management Science. Springer, Boston, MA. pp. 1114-1119, 6 pages.
Korean Intellectual Property Office, Notice of Allowance issued for Korean Patent Application No. 10-2021-7016594, dated Apr. 1, 2025, 2 pages with English language translation.
Final Office Action, U.S. Appl. No. 18/130,423, Aug. 29, 2024, 13 pages.
Non-Final Office Action, U.S. Appl. No. 18/130,423, Jan. 24, 2024, 12 pages.
Notice of Allowance, U.S. Appl. No. 18/130,423, Apr. 1, 2025, 8 pages.
Notice of Allowance, U.S. Appl. No. 18/130,423, Apr. 24, 2025, 2 pages.
Notice of Allowance, U.S. Appl. No. 18/130,423, Dec. 9, 2024, 9 pages.

* cited by examiner

SYSTEMS AND METHODS FOR INVENTORY MANAGEMENT AND OPTIMIZATION

CROSS-REFERENCE

This application is a continuation of International Patent Application PCT/US2019/059269, filed on Oct. 31, 2019, which is a continuation-in-part of U.S. patent application Ser. No. 16/506,672, filed on Jul. 9, 2019, which claims priority to U.S. Provisional Patent Application No. 62/754,466, filed on Nov. 1, 2018, each of which is entirely incorporated herein by reference.

BACKGROUND

Uncertainty is be an intrinsic and dynamic property of modern, complex supply chains. Uncertainty continually challenges inventory decisions, which may consider balancing of capital investment constraints and service-level goals. As a result of uncertainty in inventory variables, for example, software solutions for inventory management and planning may encounter challenges in accurately forecasting and predicting optimal inventory levels. In order to stay competitive in a dynamic market, businesses often need to constantly reconfigure supply chains and to manage the various types of uncertainties that are continually being introduced (e.g., both from demand-side as well as from supply-side). However, the data that is required to make informed decisions for managing these uncertainties in inventory are often stored in multiple disparate source systems (e.g., on-site or in a remote location such as a cloud network) or not tracked historically. Such systems (e.g., Material Requirements Planning, or MRP, inventory management systems), which may have been built and implemented years or decades ago, may be rule-based systems that are rigid (i.e. not adaptive to changes in supply and demand) and thus incapable of handling large volumes of dynamic data distributed across various source systems.

SUMMARY

Recognized herein is the need for systems and methods for improved inventory management and optimization using machine learning techniques, which may be applied to improve inventory management by more accurately determining optimal inventory levels.

The present disclosure provides systems and methods that may advantageously apply machine learning to accurately manage and predict inventory variables with future uncertainty. Such systems and methods may allow accurate predictions of future uncertainty in inventory variables based on aggregated data from multiple disparate data source systems, determination of optimal inventory levels, and identification of actionable recommendations to users or systems.

In an aspect, the present disclosure provides a computer-implemented method for inventory management and optimization, comprising: (a) obtaining, by the computer, an inventory dataset comprising a plurality of inventory variables, wherein the plurality of inventory variables comprises variables having future uncertainty; (b) applying, by the computer, a trained algorithm to the inventory dataset to generate a prediction of the variables having future uncertainty; and (c) applying, by the computer, an optimization algorithm to the inventory dataset to optimize the plurality of inventory variables, thereby generating an optimized inventory dataset.

In some embodiments, obtaining the inventory dataset comprises obtaining and aggregating datasets from a plurality of disparate sources. In some embodiments, the datasets comprise internal datasets and external datasets. In some embodiments, the plurality of disparate sources are selected from the group consisting of smart devices, sensors, enterprise systems, extraprise, and Internet sources, and the datasets are persisted in a plurality of data stores. In some embodiments, the plurality of inventory variables comprises a plurality of time series. In some embodiments, the plurality of inventory variables is representative of historical inventory data and/or current inventory data. In some embodiments, the historical inventory data comprises one or more types of movements selected from the group consisting of arrival movements, consumption movements, blocked movements, and inter-factory movements. In some embodiments, the variables having future uncertainty comprise one or more of: inventory level, supply factors, supplier orders, demand factors, demand forecast, material consumption, transit time, lead time, material requirements planning (MRP), inventory holding cost, and shipping cost.

In some embodiments, the trained algorithm comprises a machine learning algorithm. In some embodiments, the machine learning algorithm is selected from the group consisting of a support vector machine (SVM), a naïve Bayes classification, a linear regression, a quantile regression, a logistic regression, a random forest, and a neural network. In some embodiments, generating the prediction comprises processing the inventory dataset to fit a statistical distribution to the plurality of inventory variables. In some embodiments, fitting the statistical distribution comprises estimating one or more statistical parameters using the historical inventory data. In some embodiments, the statistical distribution is a parametric distribution selected from the group consisting of a Gaussian distribution, a Gamma distribution, and a Poisson distribution. In some embodiments, the one or more statistical parameters is selected from the group consisting of a median, a mean, a mode, a variance, a standard deviation, a quantile, a measure of central tendency, a measure of variance, a range, a minimum, a maximum, an interquartile range, and a percentile. In some embodiments, the method further comprises using the statistical distribution to generate the prediction of the variables having future uncertainty. In some embodiments, the prediction comprises a distribution of the variables having future uncertainty. In some embodiments, the distribution of the variables having future uncertainty comprises a distribution over a future duration of time. In some embodiments, the future duration time is about 1 day, about 3 days, about 5 days, about 1 week, about 2 weeks, about 3 weeks, about 1 month, about 2 months, about 3 months, about 4 months, about 5 months, about 6 months, about 7 month, about 8 months, about 9 months, about 10 months, about 11 months, about 12 months, about 14 months, about 16 months, about 18 months, about 20 months, about 22 months, about 24 months, or more than about 24 months.

In some embodiments, the optimization algorithm comprises a constrained optimization problem. In some embodiments, the constrained optimization problem minimizes a cost function or maximizes a reward function. In some embodiments, the cost function or the reward function may be a function that represents the product output of an entity, the profit of such entity, or the time of delivery to customers, to name a few examples. In some embodiments, the constrained optimization problem comprises a constraint selected from the group consisting of an inventory constraint, a service level constraint, an arrival window constraint, an order size constraint, and an ordering window constraint. In some embodiments, the service level constraint comprises a confidence level that an inventory meets a demand requirement. In some embodiments, the service level constraint is about 90%, about 95%, about 98%, about 99%, or more. In some embodiments, the minimized cost function comprises a cost selected from the group consisting of a material cost, an inventory holding cost, a shipping cost, a production delay cost, and a combination thereof. In some embodiments, the constrained optimization problem is a stochastic constrained optimization problem. In some embodiments, the optimization algorithm comprises a technique selected from the group consisting of a grid search, a random search, and a Bayesian optimization search. In some embodiments, the stochastic constrained optimization problem is a mixed integer linear programming (MILP) problem. In some embodiments, the MILP problem models the variables having future uncertainty using linear chance constraints.

In some embodiments, the method further comprises storing, by the computer, the optimized inventory dataset in a database. In some embodiments, the storing is performed through a cloud-based network. In some embodiments, the method further comprises generating, by the computer, one or more recommended inventory management decisions based on the optimized inventory dataset. In some embodiments, generating the one or more recommended inventory management decisions comprises determining a difference between the optimized inventory dataset and a reference inventory dataset. In some embodiments, the method further comprises generating, by the computer, one or more alerts of disruption risks and/or delay risks based at least in part on the optimized inventory dataset. In some embodiments, the optimized inventory dataset is generated in real time, substantially real-time, just-in-time, or any other useful timeframe. In some embodiments, the method further comprises traversing a bill of materials (BOM), wherein the BOM comprises a dynamic hierarchical graph; and displaying the BOM to a user. In some embodiments, the BOM is traversed and displayed to the user in real time, substantially real-time, just-in-time, or any other useful timeframe. In some embodiments, the inventory dataset comprises a plurality of inventory variables for a single-echelon inventory, wherein the single-echelon inventory corresponds to a single node or facility. In some embodiments, the optimization algorithm is configured to perform multi-echelon inventory optimization (MEIO), and the inventory dataset comprises a plurality of inventory variables for a multi-echelon inventory, wherein the multi-echelon inventory corresponds to a supply chain network comprising a plurality of nodes or facilities. In some embodiments, the optimization algorithm is configured to model the plurality of inventory variables using a probabilistic graphical model of the supply chain network. In some embodiments, the optimization algorithm is configured to model the plurality of inventory variables using a Bayesian optimization model of the supply chain network.

In another aspect, the present disclosure provides a computer system comprising a digital processing device comprising at least one processor, an operating system configured to perform executable instructions, a memory, and a computer program including instructions executable by the digital processing device to create an application for inventory management and optimization, the application comprising: an inventory module programmed to obtain an inventory dataset comprising a plurality of inventory variables, wherein the plurality of inventory variables comprises variables having future uncertainty; a prediction module programmed to apply a trained algorithm to the inventory dataset to generate a prediction of the variables having future uncertainty; and an optimization module programmed to apply an optimization algorithm to the inventory dataset to optimize the plurality of inventory variables, to generate an optimized inventory dataset.

In some embodiments, the application further comprises an aggregation module programmed to obtain and aggregate datasets from a plurality of disparate sources. In some embodiments, the datasets comprise internal datasets and external datasets. In some embodiments, the plurality of disparate sources are selected from the group consisting of smart devices, sensors, enterprise systems, extraprise, and Internet sources, and the datasets are persisted in a plurality of data stores. In some embodiments, the plurality of inventory variables comprises a plurality of time series. In some embodiments, the plurality of inventory variables is representative of historical inventory data and/or current inventory data. In some embodiments, the historical inventory data comprises one or more types of movements selected from the group consisting of arrival movements, consumption movements, blocked movements, and inter-factory movements. In some embodiments, the variables having future uncertainty comprise one or more of: inventory level, supply factors, supplier orders, demand factors, demand forecast, material consumption, transit time, lead time, material requirements planning (MRP), inventory holding cost, and shipping cost.

In some embodiments, the trained algorithm comprises a machine learning algorithm. In some embodiments, models can be parametric, e.g., such as a support vector machine (SVM), a naïve Bayes classification, a linear regression, a quantile regression, a logistic regression, a random forest, and a neural network, etc, or non-parametric such as Gaussian Processes, Dirichlet Processes or other Bayesian sampling-based techniques. In some embodiments, generating the prediction comprises processing the inventory dataset to fit a statistical distribution to the plurality of inventory variables. In some embodiments, fitting the statistical distribution comprises estimating one or more statistical parameters using the historical inventory data. In some embodiments, the statistical distribution is a parametric distribution selected from the group consisting of a Gaussian distribution, a Gamma distribution, and a Poisson distribution. In some embodiments, the one or more statistical parameters is selected from the group consisting of a median, a mean, a mode, a variance, a standard deviation, a quantile, a measure of central tendency, a measure of variance, a range, a minimum, a maximum, an interquartile range, and a percentile. In some embodiments, the prediction module is programmed to use the statistical distribution to generate the prediction of the variables having future uncertainty. In some embodiments, the prediction comprises a distribution of the variables having future uncertainty. In some embodiments, the distribution of the variables having future uncertainty comprises a distribution over a future duration of time. In some embodiments, the future duration time is about 1 day, about 3 days, about 5 days, about 1 week, about 2 weeks, about 3 weeks, about 1 month, about 2 months, about 3 months, about 4 months, about 5 months, about 6 months, about 7 month, about 8 months, about 9 months, about 10 months, about 11 months, about 12 months, about 14 months, about 16 months, about 18 months, about 20 months, about 22 months, about 24 months, or more than about 24 months. In some embodiments, the future duration may be less than 1 day.

In some embodiments, the optimization algorithm comprises a constrained optimization problem. In some embodiments, the constrained optimization problem minimizes a cost function. In some embodiments, the constrained optimization problem comprises a constraint selected from the group consisting of an inventory constraint, a service level constraint, an arrival window constraint, an order size constraint, and an ordering window constraint. In some embodiments, the service level constraint comprises a confidence level that an inventory meets a demand requirement. In some embodiments, the service level constraint is about 90%, about 95%, about 98%, or about 99%. In some embodiments, the minimized cost function comprises a cost selected from the group consisting of an inventory holding cost, a shipping cost, a production delay cost, and a combination thereof. In some embodiments, the constrained optimization problem is a stochastic constrained optimization problem. In some embodiments, the optimization algorithm comprises a technique selected from the group consisting of a grid search, a random search, and a Bayesian optimization search. In some embodiments, the stochastic constrained optimization problem is a mixed integer linear programming (MILP) problem. In some embodiments, the MILP problem models the variables having future uncertainty using linear chance constraints.

In some embodiments, the application further comprises a storage module programmed to store the optimized inventory dataset in a database. In some embodiments, the storing is performed through a cloud-based network. In some embodiments, the application further comprises a decision module programmed to generate one or more recommended inventory management decisions based on the optimized inventory dataset. In some embodiments, generating the one or more recommended inventory management decisions comprises determining a difference between the optimized inventory dataset and a reference inventory dataset. In some embodiments, the application further comprises an alert module programmed to generate one or more alerts of disruption risks and/or delay risks based at least in part on the optimized inventory dataset. In some embodiments, the optimized inventory dataset is generated in real time, substantially real-time, just-in-time, or any other useful timeframe. In some embodiments, the application further comprises a display module programmed to traverse a bill of materials (BOM), wherein the BOM comprises a dynamic hierarchical graph, and display the BOM to a user. In some embodiments, the BOM is traversed and displayed to the user in real time substantially real-time, just-in-time, or any other useful timeframe. In some embodiments, the inventory dataset comprises a plurality of inventory variables for a single-echelon inventory, wherein the single-echelon inventory corresponds to a single node or facility. In some embodiments, the optimization algorithm is configured to perform multi-echelon inventory optimization (MEIO), and the inventory dataset comprises a plurality of inventory variables for a multi-echelon inventory, wherein the multi-echelon inventory corresponds to a supply chain network comprising a plurality of nodes or facilities. In some embodiments, the optimization algorithm is configured to model the plurality of inventory variables using a probabilistic graphical model of the supply chain network. In some embodiments, the optimization algorithm is configured to model the plurality of inventory variables using a Bayesian optimization model of the supply chain network.

In another aspect, the present disclosure provides a non-transitory computer readable medium comprising machine-executable code that, upon execution by one or more computer processors, implements a method for inventory management and optimization, the method comprising: (a) obtaining an inventory dataset comprising a plurality of inventory variables, wherein the plurality of inventory variables comprises variables having future uncertainty; (b) applying a trained algorithm to the inventory dataset to generate a prediction of the variables having future uncertainty; and (c) applying an optimization algorithm to the inventory dataset to optimize the plurality of inventory variables, thereby generating an optimized inventory dataset.

In another aspect, the present disclosure provides a system that can receive an inventory dataset comprising a plurality of inventory variables that indicate at least historical (i) inventory levels, (ii) inventory holding costs, (iii) supplier orders, or (iv) lead times over time. The plurality of inventory variables can be characterized by having one or more future uncertainty levels. The system can process the inventory dataset using a trained machine learning model to generate a prediction of the plurality inventory variables that are characterized by having one or more future uncertainty levels. The trained machine learning model has been trained on historical inventory datasets. The system can provide the processed inventory dataset to an optimization algorithm. The optimization algorithm can to predict one or more inventory management parameters that result in a particular probability of achieving a target service level while minimizing a cost. The optimization algorithm can comprise one or more constraint conditions.

In some embodiments, the system can provide a current inventory level and a quantity of current supplier orders to the optimization algorithm and use the optimization algorithm to predict the target inventory level based at least on the current inventory level and the quantity of current supplier orders. In some embodiments, the system can generate an inventory management recommendation based on the prediction of the target inventory level. In some embodiments, the inventory management recommendation can comprise a recommendation to reduce the current inventory level. In some embodiments, the inventory management recommendation can comprise a recommendation to increase the current inventory level. In some embodiments, the inventory management recommendation can comprise a recommendation to maintain the current inventory level. In some embodiments, the inventory management recommendation can be generated in real time, substantially real-time, just-in-time, or periodically in hours, days, weeks, months, or more.

In some embodiments, the system can compute the present, incoming or expected demand requirement using forecasted demand for finished products and a bill of materials (BOM) for the finished products. In some embodiments, the BOM can comprise a dynamic hierarchical graph.

In some embodiments, the inventory dataset can comprise internal data and external data. In some embodiments, the inventory dataset can be received from a plurality of disparate sources selected from the group consisting of smart devices, sensors, enterprise systems, extraprise, and Internet sources.

In some embodiments, the plurality of inventory variables further can comprise one or more inventory movements selected from the group consisting of arrival movements, consumption movements, blocked movements, and inter-factory movements.

In some embodiments, the plurality of inventory variables can further comprise one or more of a demand forecast, material consumption, transit time, and shipping cost.

In some embodiments, the trained machine learning model can be selected from the group consisting of a support vector machine (SVM), naïve Bayes classification, linear regression, logistic regression, a random forest, and a neural network.

In some embodiments, the prediction of the plurality of inventory variables can comprise a statistical distribution of the plurality of inventory variables.

In some embodiments, the statistical distribution can comprise one or more statistical parameters.

In some embodiments, the one or more statistical parameters can be selected from the group consisting of a median, a mean, a mode, a variance, a standard deviation, a quantile, a measure of central tendency, a measure of variance, a range, a minimum, a maximum, an interquartile range, and a percentile.

In some embodiments, the statistical distribution can be a parametric distribution selected from the group consisting of a Gaussian distribution, a Gamma distribution, and a Poisson distribution.

In some embodiments, the optimization algorithm can minimize a cost function. In some embodiments, the optimization algorithm can further comprise a constraint condition selected from the group consisting of an inventory constraint, a service level constraint, an arrival window constraint, an order size constraint, and an ordering window constraint. In some embodiments, the optimization algorithm can be a stochastic constrained optimization algorithm. In some embodiments, the stochastic constrained optimization algorithm can be a mixed integer linear programming (MILP) problem. In some embodiments, the optimization algorithm can comprise a technique selected from the group consisting of a grid search, a random search, and a Bayesian optimization search.

In some embodiments, the inventory dataset can comprise a plurality of inventory variables for a single-echelon inventory, wherein the single-echelon inventory corresponds to a single node or facility.

In some embodiments, the optimization algorithm can be configured to perform multi-echelon inventory optimization (MEIO), wherein the inventory dataset can comprise a plurality of inventory variables for a multi-echelon inventory, wherein the multi-echelon inventory corresponds to a supply chain network comprising a plurality of nodes or facilities. In some embodiments, the optimization algorithm can be configured to model the plurality of inventory variables using a probabilistic graphical model of the supply chain network. In some embodiments, the optimization algorithm can be configured to model the plurality of inventory variables using a Bayesian optimization model of the supply chain network.

Another aspect of the present disclosure provides methods corresponding to the operations performed by any of the systems described above or elsewhere herein.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

DETAILED DESCRIPTION

Figure 1:
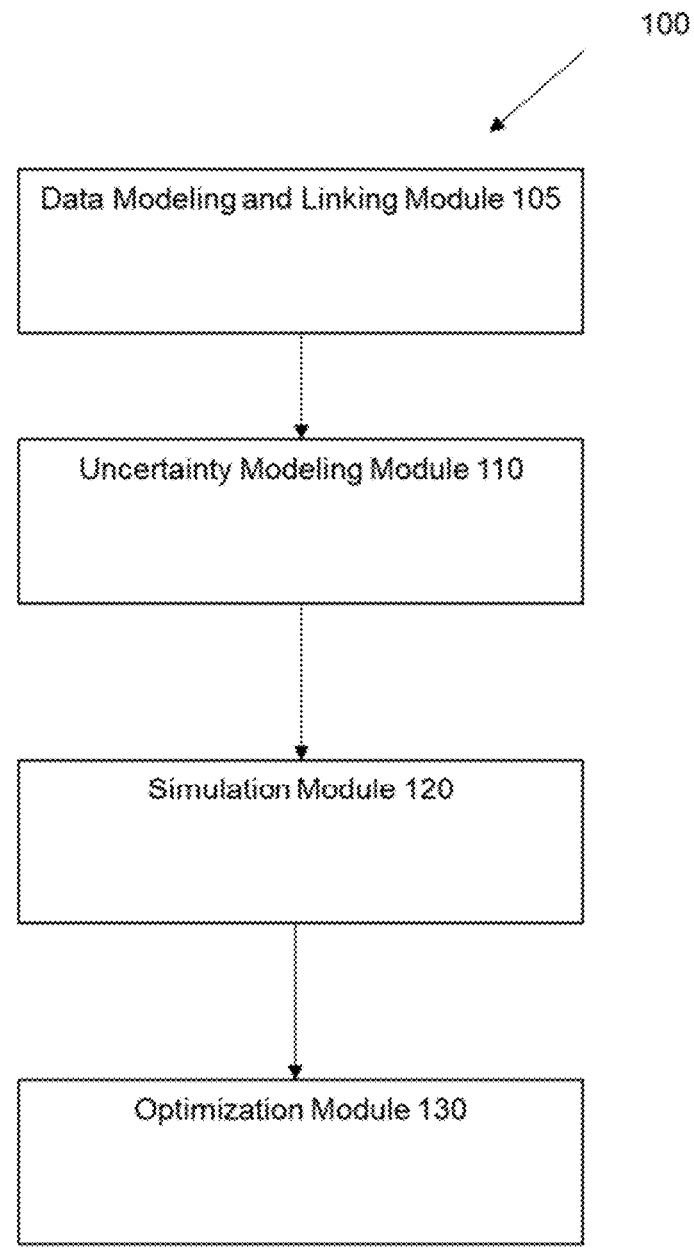
FIG. 1 illustrates an example of a system for inventory management and optimization.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Recognized herein is the need for systems and methods for improved inventory management and optimization using machine learning techniques, which may be applied to improve inventory management by more accurately determining optimal inventory levels.

Uncertainty is be an intrinsic and dynamic property of modern, complex supply chains. Uncertainty continually challenges inventory decisions, which may consider balancing of capital investment constraints and service-level goals. As a result of uncertainty in inventory variables, for example, software solutions for inventory management and planning may encounter challenges in accurately forecasting and predicting optimal inventory levels. In order to stay competitive in a dynamic market, businesses often need to constantly reconfigure supply chains and to manage the various types of uncertainties that are continually being introduced (e.g., both from demand-side as well as from supply-side). However, the data that is required to make informed decisions for managing these uncertainties in inventory are often stored in multiple disparate source systems (e.g., on-site or in a remote location such as a cloud network). Such systems (e.g., Material Requirements Planning, or MRP, inventory management systems), which may have been built and implemented years or decades ago, may be rule-based systems that are rigid and thus incapable of handling large volumes of data distributed across various source systems.

In view of these challenges in inventory management systems, a "big data" artificial intelligence platform may be necessary to aggregate data from multiple disparate source systems (e.g., enterprise system, IoT sensors, and third-party data providers) and apply artificial intelligence-based techniques that continually incorporate and learn from new or updated datasets. For example, the types of data useful for optimizing inventory may include demand forecast, supplier orders, production orders, bill of materials (time-varying), change history of re-order parameters, and inventory movement data.

Recognizing the need for improved inventory management and optimization, the present disclosure provides systems and methods that may advantageously apply machine learning to accurately manage and predict inventory variables with future uncertainty. Such systems and methods may allow accurate predictions of future uncertainty in inventory variables based on aggregated data from multiple disparate data source systems, determination of optimal inventory levels, and identification of actionable recommendations to users.

By implementing improved inventory management and optimization module systems and methods of the present disclosure, companies across a broad range of industries, such as manufacturing, automotive, and retail, may achieve significance reductions in inventory by 20% to 25% or more through optimization, thereby decreasing costs by about 2% to 5% of revenues. In doing so, such companies, which may typically lock up a significant part of their working capital in inventory (e.g., an average inventory ranging from 10%-20% of revenue), can reinvest the cost savings into the company's business in order to increase shareholder value. For example, a company with $10 billion in annual revenue can potential free up $200 million to $500 million in working capital by optimizing their inventory using systems and methods provided herein.

In order to effectively apply artificial intelligence-based methods to inventory management and optimization systems, the necessary data may be aggregated from various disparate source systems, such as an Enterprise Resource Planning system, an Asset Management system, a Supplier Management system, and an Inventory Planning system. In some cases, enterprises may engage third-party service providers to perform data integration, which may be costly. Alternatively, enterprises may attempt to perform data integration in-house using open-source technologies, but such approaches often encounter significant complexity and monetary and time costs, with uncertain success. Using systems and methods of the present disclosure, enterprises can apply artificial intelligence-based inventory management and optimization algorithms on platforms that enable seamless, scalable, and reliable integration of data sets from multiple disparate source systems.

Once the data aggregation and integration have been performed, artificial intelligence-based techniques can be used to effectively and dynamically manage uncertainty, and systematically reduce inventory levels across all locations while minimizing the probability of stock-outs. In particular, systems and methods of the present disclosure can apply key elements of artificial intelligence-based techniques, including statistical modeling, machine learning, and optimization, to significantly improve inventory optimization.

In an aspect, the present disclosure provides a computer-implemented method for inventory management and optimization. The method for inventory management and optimization may comprise obtaining an inventory dataset comprising a plurality of inventory variables, wherein the plurality of inventory variables comprises variables having future uncertainty. The method for inventory management and optimization may further comprise applying a trained algorithm to the inventory dataset to generate a prediction of the variables having future uncertainty. The method for inventory management and optimization may further comprise applying an optimization algorithm to the inventory dataset to optimize the plurality of inventory variables, thereby generating an optimized inventory dataset.

In some embodiments, methods and systems for inventory management and optimization may perform optimization of a daily inventory level. Manufacturing systems typically maintain a log of inventory movements, such as arrivals from suppliers, consumption in a production line, and any other intra- and inter-facility shipments (miscellaneous movements). The movement data can be used to calculate the historical inventory levels for each item, where arrivals have a positive contribution to the inventory level, consumption has a negative contribution, and all other miscellaneous movements can result in either a positive or a negative contribution to the inventory level. For example, the inventory at a given time t can be expressed as the inventory at a prior time (t−1), plus the arrivals at time t, minus the consumption at time t, plus miscellaneous movements at time t, as given by the equation below.

$$Inventory_t = Inventory_{t-1} + Arrivals_t - Consumption_t + Miscellaneous_t$$

In some embodiments, methods and systems for inventory management and optimization may perform optimization of a demand forecast. In the case of manufacturers, the demand forecast (or planned consumption) for each item over a planning horizon can be computed using the forecasted demand for the finished products, the product configurations, and a bill of materials (BOM). BOM is a dynamic (time-varying) hierarchical graph that provides a list of all the items and intermediate assemblies required to manufacture a finished product, along with their quantities. The traversed BOM may be displayed to a user. For example, the BOM may be traversed and displayed to the user.

In some embodiments, methods and systems for inventory management and optimization may perform optimization of Material Requirements Planning (MRP). MRP is often based on several constraints that determine the timing and quantity of the orders that need to be placed with suppliers. For example, such constraints may be defined using reorder parameters. Reorder parameters may be categorized into two groups: (1) parameters determined by the manufacturer (e.g., safety stock, lot size, breakage, warranty replacement, or safety time) and (2) parameters determined by the supplier (e.g., minimum order size, lead time, etc.), or (3) parameters determined by the customer (e.g., cancellations and returns).

In some embodiments, methods and systems may formulate inventory management and optimization as a stochastic constrained optimization problem that solves for the optimal values of reorder parameters (e.g., safety stock) that minimize the total landed cost (e.g., inventory holding cost and shipping cost, accounting for variability in the price of the inventory items), while maintaining a level of confidence (α) on the availability of items in stock (e.g., a service level constraint). The service level constraint may be adjustable for each item (e.g., with a 90%, 95%, 96%, 97%, 98%, or 99% confidence), thereby providing the manufacturer a level of control based on several factors, such as cost of stock-outs and service level agreements with their customers.

By solving the stochastic constrained optimization problem, a set of stochastic variables may be simulated or predicted. The predictions can then be incorporated into the optimization problem. For example, variables corresponding to stochastic components of a supply chain (e.g., stochasticity associated to supply for each facility in the supply chain) can be modeled. This can be done through conducting a forward pass through the supply chain. Particularly, the forward pass can begin with facilities i without children. For these facilities, it is known what arrivals will actually arrive at time t and what arrivals are scheduled to arrive at the facility. For the latter, the stochasticity (uncertainty) in quantity and time can be simulated to predict what portion of the arrival will be realized that day. This result can partly define the end-of-day inventory of that facility for that day.

The optimization problem given below can be formulated as a mixed integer linear programming (MILP) problem by modeling demand and supply-side uncertainties as linear chance constraints. Such MILP problems can be efficiently solved using MILP solvers.

$$\operatorname*{argmin}_{Safety\ stock} \text{Inventory Holding cost} +$$
$$\text{Shipping cost such that } Prob\ (\text{Inventory} > 0) \geq \alpha$$

Systems and methods for inventory management and optimization may be applied to a wide variety of enterprises, such as global manufacturers with footprints across multiple countries or continents. For example, such manufacturers may operate hundreds of factories globally, manufacturer highly complex equipment, and hold average inventory levels worth hundreds of millions or even billions of dollars. For example, based on standard industry practice among manufacturers of expensive and sophisticated equipment (e.g., industrial equipment), manufacturers may allow their customers to configure products with dozens or hundreds of individual options, leading to products having hundreds or thousands of permutations. In such cases, the customized nature of the manufacturer's products may drive significant complexity in managing inventory levels during the manufacturing process. For example, since the final configuration of a product is often not known until close to submission of the order for that product, the manufacturer may routinely hold significant excess inventory on hand to fulfill orders on time.

Using systems and methods for inventory management and optimization disclosed herein, manufacturers may achieve significant reductions in average inventory levels of about 5%, about 10%, about 15%, about 20%, about 25%, about 30%, about 35%, about 40%, about 45%, about 50%, about 55%, about 60%, about 65%, about 70%, about 75%, about 80%, about 85%, or about 90%. Such significant reductions in average inventory levels may confer additional benefits, such as savings in shipping cost (due to fewer parts being ordered) and increased productivity of inventory analysts by helping them focus on higher value-added tasks instead of tracking, managing and auditing available inventory. In addition, using systems and methods for inventory management and optimization disclosed herein, key insights may be uncovered which may prove useful during negotiations with suppliers (e.g., the effect of supplier planning time fence on inventory levels).

FIG. 1 illustrates an example of a system for inventory management and optimization 100 that is configured to implement the methods described in the present disclosure. The system 100 may have a data modeling and linking module 105, an uncertainty modeling module 110, a simulation module 120, and an optimization module 130. The data modeling and linking module 105 can enable the system collect and aggregate inventory datasets and later such inventory data sets. The other modules will be described in detail below.

Statistical Modeling of Uncertainty

Uncertainty is an intrinsic property of modern, complex supply chains. There may be a number of sources of uncertainty in a supply chain network. Three major sources of uncertainty may be (1) supplier-related uncertainty, (2)

facility-related uncertainty, and (3) demand uncertainty. Supplier-related uncertainty may include uncertainty in the quantity, quality, or price of source materials. Supplier-related uncertainty may also include uncertainty of when such source materials will be available or how long such source materials will take to ship. Facility-related uncertainty may be uncertainty in the availability of production resources, e.g., laborers, machines, time, etc. Demand uncertainty may be uncertainty in the demand for final products. Demand may change over time and by geography. There may be other sources of uncertainty in complex supply chains, such as shipping uncertainty. Some examples of particular uncertain variables in supply chains are inventory level, supply factors, supplier orders, demand factors, demand forecast, material consumption, transit time, seasonality, lead time, material requirements planning (MRP), inventory holding cost, and shipping cost.

The uncertainly module 110 can model the above-mentioned uncertainty and any other types of uncertainty that may be associated with complex supply chains. More specifically, the uncertainty module 110 can implement machine learning and other types of models that are programmed or configured to predict distributions of variables (e.g., inventory variables) that have future uncertainty. The models can be trained on historical values of the inventory variables.

One example of a stochastic inventory variable is transit time, which may depend on one or more external factors, such as network congestion, weather, and geo-political events. If transit time has or is assumed to have a Gaussian distribution, the systems and methods described herein can fit a Gaussian distribution to a set of historical transit times to estimate a mean and a variance of future transit times. If transit time instead has or is assumed to have an asymmetric distribution, the systems and methods described herein can fit, for example, a Gamma distribution to the historical transit time to estimate these parameters.

More generally, the models described herein can be parametric models (e.g., linear regression models, logistic regression models, quantile regression models, support vectors machines (SVMs), random forest models, boosted tree models, etc.) that can be used to predict parameters (e.g., a median, a mean, a mode, a variance, a standard deviation, a quantile, a measure of central tendency, a measure of variance, a range, a minimum, a maximum, an interquartile range, a percentile, or a combination thereof) of the inventory variables. As one example, regression models may be trained to learn from historical data how these distributions vary over time, based on features such as season of the year, etc. The trained regression models may then be used to predict the prior and conditional distribution of the random variables. Each node in a supply chain may estimate the distribution of the random variables locally and shares this information with other nodes in the supply chain using belief propagation techniques. The nodes continue to propagate their beliefs to other nodes in the system till convergence. Once the beliefs converge, the recommended safety stock at each node can be estimated locally using the conditional distribution of the inventory variable.

Alternatively, the models may be non-parametric models such as Gaussian processes, Dirichlet processes, or other Bayesian sampling-based techniques. A Gaussian process is a stochastic model defined by a collection of random variables indexed by time. Each finite collection of the random variables has a multivariate normal distribution. That is, each finite collection of the random variables is normally distributed. The distribution of a Gaussian process is the joint distribution of all the random variables, and as such, it is a distribution over functions with a continuous domain. A Dirichlet process, meanwhile, is a stochastic model whose range itself is a set of probability distributions.

The distribution of uncertainty of inventory variables often tends to change over time. As an example, the variance in the transit time of a source material or product may increase during the winter season. As such, the models described above may be used to predict distributions of inventory variables over future durations of time. The future durations of time may correspond to planning horizons for the inventory variables being optimized. The planning horizons may vary depending on the customer, supplier, and the material. For example, the planning horizons may be about 1 day, about 3 days, about 5 days, about 1 week, about 2 weeks, about 3 weeks, about 1 month, about 2 months, about 3 months, about 4 months, about 5 months, about 6 months, about 7 month, about 8 months, about 9 months, about 10 months, about 11 months, about 12 months, about 14 months, about 16 months, about 18 months, about 20 months, about 22 months, about 24 months, or more. The planning horizons may dynamically change as new data is incorporated into the models. In case some models show deterioration of performance, they are re-trained automatically leveraging the most recent available data.

Figure 2:
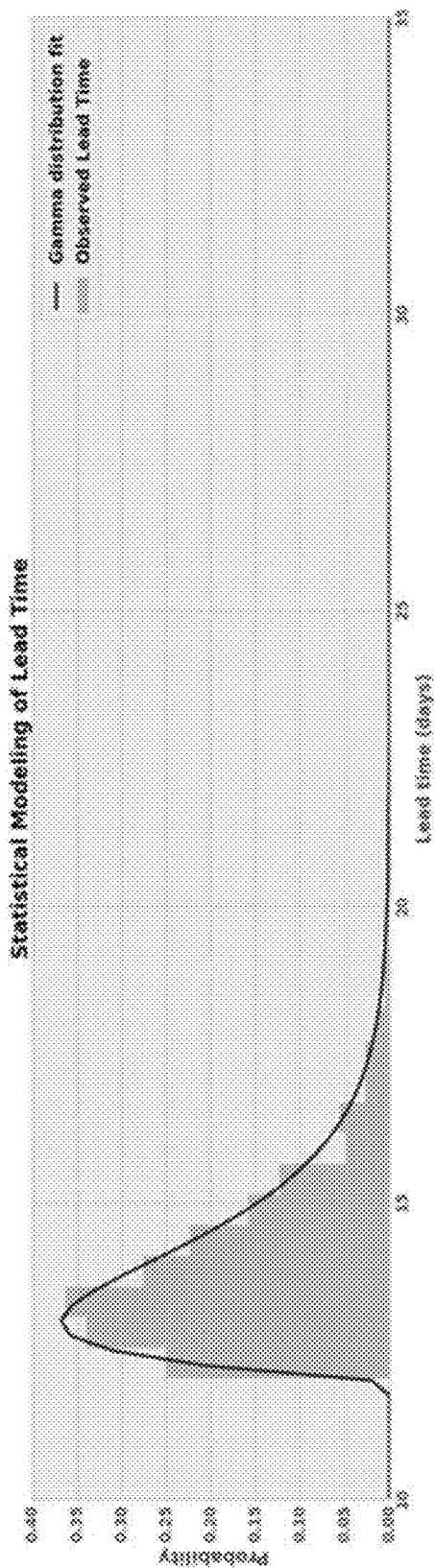
FIG. 2 illustrates an example of statistical modeling of uncertainty in lead time by fitting a Gamma distribution to observed lead time data.

FIG. 2 illustrates an example of statistical modeling of uncertainty in lead time by fitting a Gamma distribution to observed lead time data. The distribution may be calculated over a lead time of no more than about 5 days, no more than about 10 days, no more than about 15 days, no more than about 20 days, no more than about 25 days, no more than about 30 days, no more than about 35 days, no more than about 40 days, no more than about 45 days, no more than about 50 days, no more than about 55 days, no more than about 60 days, no more than about 70 days, no more than about 80 days, or no more than about 90 days. In some cases, the distribution may be calculated over a lead time of less than 5 days.

The inventory variables may comprise one or more time series to represent time-varying data, such as historical inventory data and/or current inventory data. Historical inventory may be provided by the customer or calculated by the system by leveraging the material movement data. For example, the historical inventory data can include different types of movements related to inventory management and optimization, such as arrival movements, consumption movements, blocked movements, and miscellaneous movements (e.g., inter-factory movements).

Inventory dataset may be obtained from smart devices, sensors, enterprise systems, extraprise, and Internet sources. Such datasets may be persisted across one or more data stores.

Figure 3:
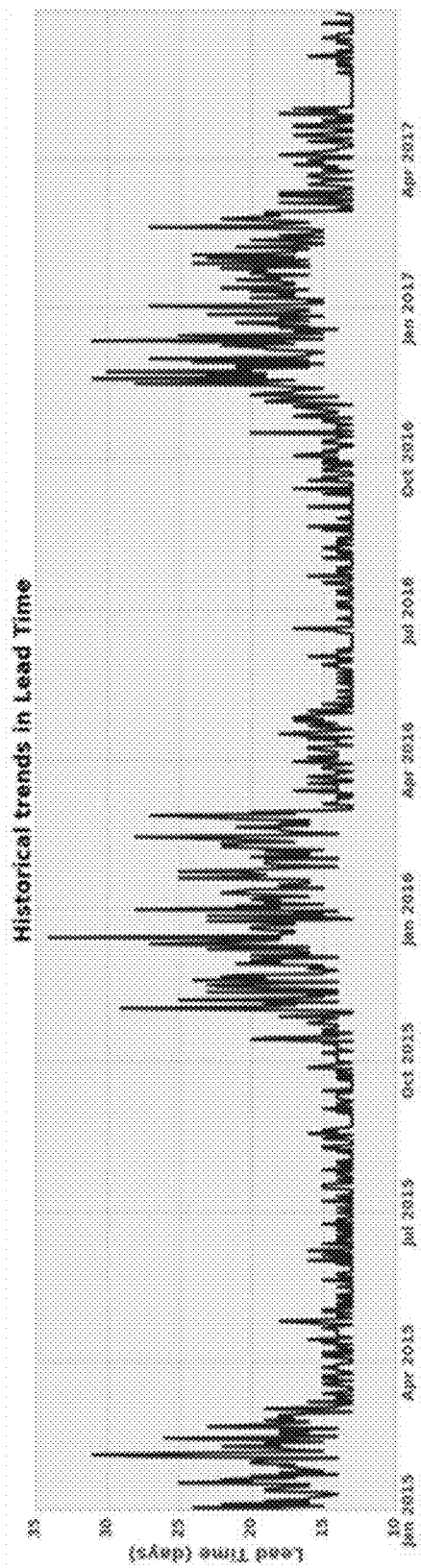
FIG. 3 illustrates an example of historical trends in lead time over a period of time, which can be used to train a machine learning algorithm to predict future uncertainty in lead time.

FIG. 3 illustrates an example of historical trends in lead time over a period of time (e.g., about 28 months), which can be used to train a machine learning algorithm to predict future uncertainty in lead time.

Prediction of Stochastic Variables and Simulation of Effects on Inventory Management This section describes tools that can leverage the models described above and new models to proactively, rather than reactively, make operational decisions in supply chain management.

What-if Simulations

The simulation module 120 of FIG. 1 can conduct "what-if" simulations, which may simulate what would have happened in a particular time period if in the past a different action had been taken during the inventory management process, e.g., if a different safety stock had been used. The simulations can use historical data and/or modeled uncertainty distributions to simulate stochasticity. To provide a concrete example, one way to implement such a simulation framework is as follows:

First, the simulation module 120 can obtain data related to historical replenishment outcomes. Such data can provide valuable insights into how inventory for different parts have been managed at a facility. Such data can include (1) material movements (e.g., how or when a part has been consumed or moved from or to available inventory), (2) demand forecast (daily, weekly or monthly, either on a product or part level), and (3) arrival patterns (e.g., how suppliers have honored their obligations). The simulation module 120 can use a materials requirement planning (MRP) algorithm to process this data to simulate the effects of changing different parameters in the inventory management process.

In one example, the simulation module 120 can investigate the effect of changing the safety stock of an item while fixing all other parameters. Starting with some initial inventory at the beginning of the simulation period and knowing the demand forecast through the period, the simulation module 120 can simulate the inventory management process during that period by running the MRP algorithm based on the new choices of safety stock. This way, and knowing the material movement history, the simulation module 120 can evaluate the robustness and cost effectiveness of the new choices of safety stock. Because the simulation module 120 changes some of the parameters, it can schedule new arrivals during this period which would be different from what was observed in historical data. However, there may be uncertainty related to supplier behavior. Therefore, in order to make the what-if analysis more realistic, the simulation module 120 can also simulate the effect of supplier uncertainty on the new scheduled arrivals. To do so, the parametric and non-parametric models described above can be incorporated into the simulation.

This can be done by extracting the uncertainty associated with the historical quantity and timing of arrivals. These uncertainties may be represented using empirical distributions or through fitting suitable parametric or non-parametric distributions to these populations. The simulation module 120 can then simulate the uncertainty associated with each newly scheduled arrival by sampling from these distributions. More specifically, assume that there is a scheduled arrival of 50 units of a part for day t+5. The simulation module 120 can simulate uncertainty pertaining to the quantity and timing of this arrival by sampling from their corresponding distributions. Assume that the samples from the quantity and time uncertainties are 10 and 2 respectively. The simulation module 120 can simulate that the scheduled arrival has actually arrived on day t+7 with quantity 40. Notice that the information concerning the perturbation is not known to the replenishment process until it is realized at time t+5. That is to say, at time t+5 the arrival that will be delayed is known, but not by ow much. Once at time t+7 the arrival expected at t+5 arrives only 40 units were received instead of 50.

Implementations of this framework may be modular and can incorporate different replenishment approaches and different ways for simulating supplier or uncertain movement effects. Moreover, the presented approach is one such approach for simulating uncertainty or conducting what-if simulations which looks backward in time. The same approach can also be conducted forward in time. The main difference is that, for the forward-looking case, the simulation module 120 may rely on predictive models of uncertainty to simulate uncertainty.

The simulation module 120 can also predict what may happen in the future. More specifically, the simulation module 120 can simulate what would happen in the future considering particular uncertainties in inventory variables. For this, the simulation module 120 can use the uncertainty models described above to simulate uncertainty and inject such uncertainties into the inventory management process. One example of such a simulation is as follows:

To run an MRP for a horizon in the future, given all the other re-order parameters, one approach that informs upon the inventory management process relies on studying the effect of future uncertainties on the future/forward-projected inventory profile. To this end, the simulation module 120 can first run the MRP with the given choice of re-order parameters. The MRP can then schedule arrivals in the future to keep up with the demand forecast and based on other re-order parameters. Assuming there are no uncertainties, the inventory may not go below zero. If there are uncertainties, the simulation module 120 can sample, for example, a sequence of time and quantity uncertainties from their corresponding predictive distributions generated by the parametric and non-parametric models described above. The time uncertainty sequence can be used for perturbing the scheduled arrivals by the MRP, and the quantity uncertainty sequences can be used for perturbing the demand forecast (consumption in the future) and available inventory. Each combination of uncertainty sequences may result in a perturbed inventory profile. Repeating this process for several of such uncertainty sequence combinations may generate several perturbed profiles for different uncertainty pairs. This provides an empirical joint distribution of the forward-projected inventory profile. This empirical distribution can then be used, for example, to provide an estimate of obtained future service level given the considered management practices.

The presented simulation approaches enable estimation of different stochastic variables over a horizon into the future, which includes inventory and service level. These simulation tools may enable users to make more informed decisions and evaluate changes to their management practices or adjust their expectations for what is to come in the future.

The simulation module 120 can additionally quantify the uncertainty associated with placed orders with suppliers (e.g., orders that have not reached their due dates) and uncertainty associated with customer orders received by the facility. This can benefit from models discussed in the previous section or may require developing extra models. These then enable the operators to manage the inventory in a more proactive rather than reactive fashion.

Inventory Management and Optimization

Inventory management and optimization may concern optimizing three different categories of variables: (1) variables set by the manufacturer that provide robustness with respect to sources of uncertainty, (2) variables concerning interaction with suppliers, including order timing and quantity and other parameters governing the supplier interactions that are set through negotiations with the suppliers (e.g., lead time, minimum order quantity, etc.), and (3) variables defining production planning, including production plans and schedules for satisfying customer orders.

Regarding (1), in order to optimize variables that provide robustness, optimization the optimization module 130 of FIG. 1 can leverage the simulation methodologies discussed in the previous section. Particularly, the optimization module 130s can evaluate the performance of different combinations of values of the variables under consideration.

To this end, the optimization module 130 can perform what-if simulations for periods in the past. For every combination of values, the optimization module 130 can run a series of simulations to evaluate the performance of the combination. The performance criterion may be operational costs and obtained service level. In order to pick what combinations to evaluate, binary search, grid search, random search, or Bayesian optimization may be used.

The optimization module 130 can alternatively or additionally perform forward-looking what-if simulations for periods in the future. For every combination of values, the optimization module 130 can run a series of simulations to evaluate the performance of the combination. The performance criterion may be operational costs and obtained service level. The optimization module 130 may use binary search, grid search, random search or Bayesian optimization to pick what combinations to evaluate.

The optimization module 130 can alternatively or additionally project future stochastic inventory variables. For every combination of values, we can run a series of forward-projections to evaluate the performance of the combination. The performance criterion may be operational costs and obtained service level. The optimization module 130 may use binary search, grid search, random search or Bayesian optimization to pick what combinations to evaluate. In this case, the optimization module 130 may not need to evaluate different combinations and may be able to derive suitable combinations from the obtained distribution of forward projected stochastic variables.

The variables mentioned above may be selected in a number of different ways. For example, the optimization module 130 can use different combinations of selection rules or policies for selecting the variables under consideration. These rules may be static, parametrized by certain parameters, e.g., order-up-to-policy, or be based on quantile models discussed above.

In one example, the optimization module 130 may optimize safety stock and safety time and use a combination of different quantile models to quantify uncertainty and different models for time uncertainty for tuning safety stock and safety time, respectively. Safety stock levels may correspond to the excess inventory that is to be held to provide robustness with respect to quantity uncertainty, and safety time may correspond to a time buffer that is used for alleviating possible delays from suppliers or to change timelines by customers can be accommodated with minimal adverse effects.

For evaluating different combinations of selection rules/policies we may use backward-looking simulations, forward-looking what-if simulations, and forward projection of stochastic variables as described above.

The optimization module 130 can also use optimization algorithms that do not rely on the simulation approaches. To this end, the optimization module 130 can parametrize a mathematical optimization problem with parameters that include the variables under consideration. This may lead to stochastic mixed-integer linear programming (MILP) which can leverage the outputs from the uncertainty models to form stochastic terms of the objective function of the optimization problem or stochastic constraints associated with it, e.g., chance constraints. The cost to optimize for may be inventory holding cost, ordering cost, production or operational costs, sales lost or achieved profits, etc. The constraints may include inventory evolution or operational constraints within the facility (e.g., encoding BoM, replenishment process constraints, and demand satisfaction or management constraints.)

In order to optimize variables relating to interactions with suppliers, including order amounts and timing, the optimization module 130 can use a direct mathematical optimization approach. This optimization is commonly conducted in the case of legacy MRP frameworks that lack the necessary sophistication to handle complexities of interacting with suppliers and hence are replaced by this optimization framework. This commonly leads to stochastic MILPs which can leverage the outputs from models for uncertainty to form stochastic terms of the objective function of the optimization problem or stochastic constraints associated with it, e.g., chance constraints. The cost to optimize for may be inventory holding cost, ordering cost, production or operational costs, sales lost or achieved profits, etc. The constraints may be or include, inventory evolution, operational constraints within the facility, replenishment process constraints (e.g., any replenishment constraints that are not the target of optimization), and demand satisfaction or management constraints. The constraints and terms in the objective function that concern interaction with suppliers may encode costs associated with different interaction approaches with different suppliers, and the rules associated to these (which are commonly conditional and time varying constraints), e.g., time-varying multi-column pricing, and timing and permission associated with canceling or adding to existing outstanding orders. This optimization formulation has the necessary flexibility to jointly optimize these variables and those concerning robustness.

In the event that this problem is prohibitively costly to solve, the optimization module 130 may either decompose the problem and use distributed algorithms for solving the problem or simultaneously solve relaxations (which commonly result in stochastic LPs) and restrictions (projection techniques) of these problems. This can enable the system to provide approximate solutions to the problem, but also to quantify the level suboptimality of the approximate solution.

For variables that define production planning (3), the optimization module 130 can also use a direct optimization approach to optimize variables concerning production planning and/or how to satisfy sales orders. This also commonly leads to stochastic MILPs which can leverage the outputs from the uncertainty models described above to form stochastic terms of the objective function of the optimization problem or stochastic constraints associated with it, e.g., chance constraints. The cost to optimize may be inventory holding cost, ordering cost, production or operational costs, sales lost or achieved profits, etc. The constraints may be or include, inventory evolution, operational constraints within the facility, constraints that clearly encode replenishment process framework, and demand satisfaction or management constraints based on contractual obligations. Such obligations may also be included in the cost function. The constraints and terms in the objective function that concern interaction with the customers should clearly encode costs associated to different interaction approaches with different customers and their associated contractual obligations, which may include hard-coded rules associated with these (which are commonly conditional and time-varying constraints), e.g., time-varying penalty for missed orders or constraints concerning latest possible delivery dates. The constraints may also encode interactions among equipment involved in the production process, which may not be simply represented using BoM. The optimization formulation has the necessary flexibility to jointly optimize these variables and those concerning robustness and/or the ones concerning replenishment process.

Such a constrained optimization problem may minimize a cost function, and may include constraints pertaining to the material ordering mechanism or MRP (material requirement planning) algorithm, such as an inventory constraint, a service level constraint, an arrival window constraint (e.g., days of the week when orders can arrive), an order size constraint (e.g., a minimum order size and rounding value), an ordering window constraint (e.g., with inactive or dead periods during which new orders cannot be placed), or a combination thereof. The set of constraints for the constrained optimization problem may help determine allowed times and amounts for which orders can be placed. In some embodiments, the service level constraint comprises a confidence level that an inventory meets a demand requirement (e.g., does not experience a stock-out event). For example, the service level constraint may be about 90%, about 95%, about 98%, or about 99%. The service level constraint may correspond to the service level that is desired by the customer. The desired service level may be a configurable parameter and may vary for each customer and for each material.

In some embodiments, the minimized cost function can represent a cost such as an inventory holding cost, a shipping cost, a backorder (e.g., production delay) cost, or a combination thereof. The cost function may be configurable and can vary with each customer.

The constrained optimization problem may be a stochastic constrained optimization problem. For example, in instances where an enterprise is bound to using currently implemented legacy MRP solutions, the current MRP algorithm may be treated as a black-box, and the constrained optimization problem may be solved using a black-box optimization algorithm. The optimization algorithm may use any suitable technique for solving the optimization problem, such as a grid search, a random search, a Bayesian optimization search, or a combination thereof.

In some embodiments, such as instances where an enterprise is not bound to using legacy MRP solutions, the stochastic constrained optimization problem is formulated as a mixed integer linear programming (MILP) problem. The MILP problem may model the variables having future uncertainty using one or more linear chance constraints. The MILP problem may be solved, for example, by jointly optimizing for the inventory and the MRP (e.g., orders placed).

In the event that this problem is prohibitively costly to solve, the optimization module 130 may either decompose the problem and use distributed algorithms for solving the problem or harbor to simultaneously solving relaxations (commonly result in stochastic LPs) and restrictions (projection techniques) of these problems.

After the inventory dataset has been optimized, the optimized inventory dataset may be stored in a database. The storing may be performed through a cloud-based network (e.g., in a database located on one or more cloud-based servers).

The method for inventory management and optimization may further comprise generating one or more recommended inventory management decisions based on the optimized inventory dataset. For example, a difference may be determined between the optimized inventory dataset and a reference inventory dataset, and the recommended inventory management decisions may be generated based on the determined difference between the optimized inventory dataset and the reference inventory dataset. In some cases, after the inventory dataset has been optimized, the method for inventory management and optimization may further comprise generating one or more alerts of disruption risks and/or delay risks based at least in part on the optimized inventory dataset.

Figure 4:
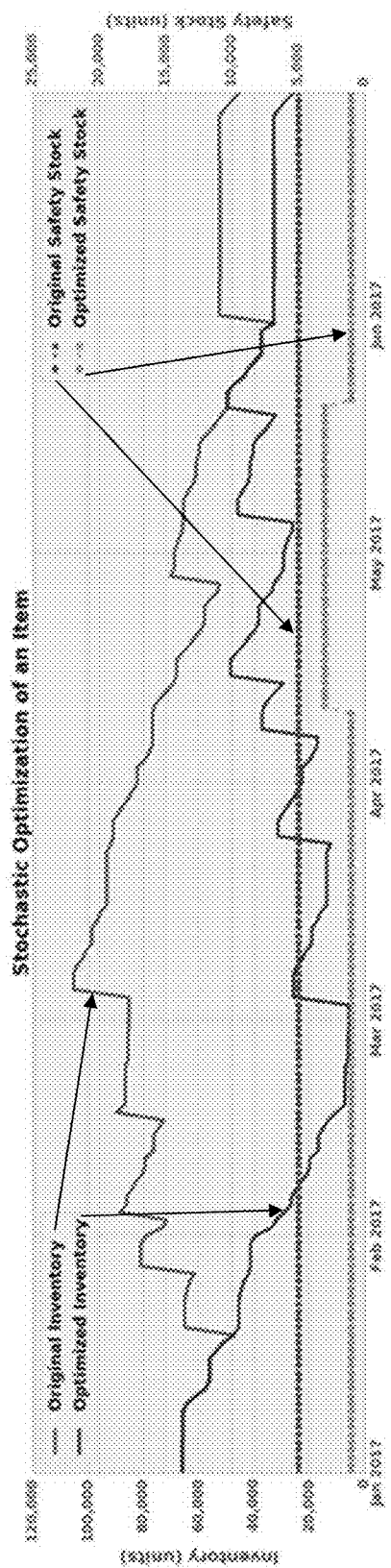
FIG. 4 illustrates an example of stochastic optimization of inventory level of an item.

FIG. 4 illustrates an example of stochastic optimization of inventory level of an item over a period of time (e.g., about 6 months). For example, an original inventory level over a duration of time may be configured to have a high probability or confidence of maintaining an inventory level that is at least the original safety stock level. As another example, the optimized inventory level over a duration of time may be configured to have a high probability or confidence of maintaining an inventory level that is at least the optimized safety stock level. Since the optimized safety stock level may be less than the original (un-optimized) safety stock level, the enterprise may realize potentially significant cost savings by maintaining inventory at the optimized safety stock level rather than the original safety stock level, while still meeting contractual requirements of their customers.

Figure 5:
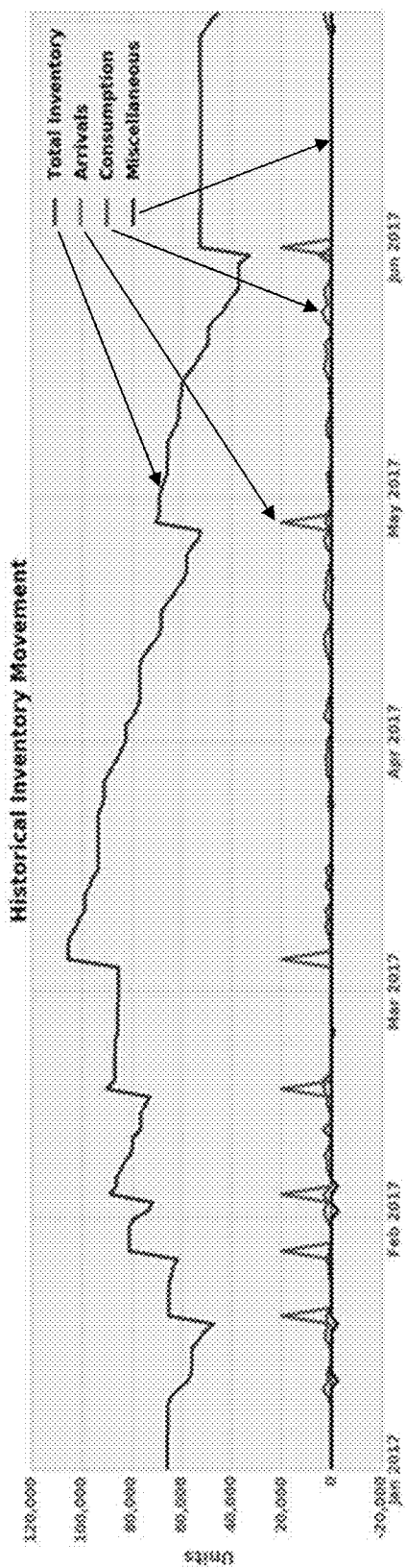
FIG. 5 illustrates an example of historical inventory movement (including arrival movements, consumption movements, and miscellaneous movements) and total inventory over a period of time.

FIG. 5 illustrates an example of historical inventory movement (including arrival movements, consumption movements, and miscellaneous movements) and total inventory over a period of time (e.g., about 6 months).

Figure 6:
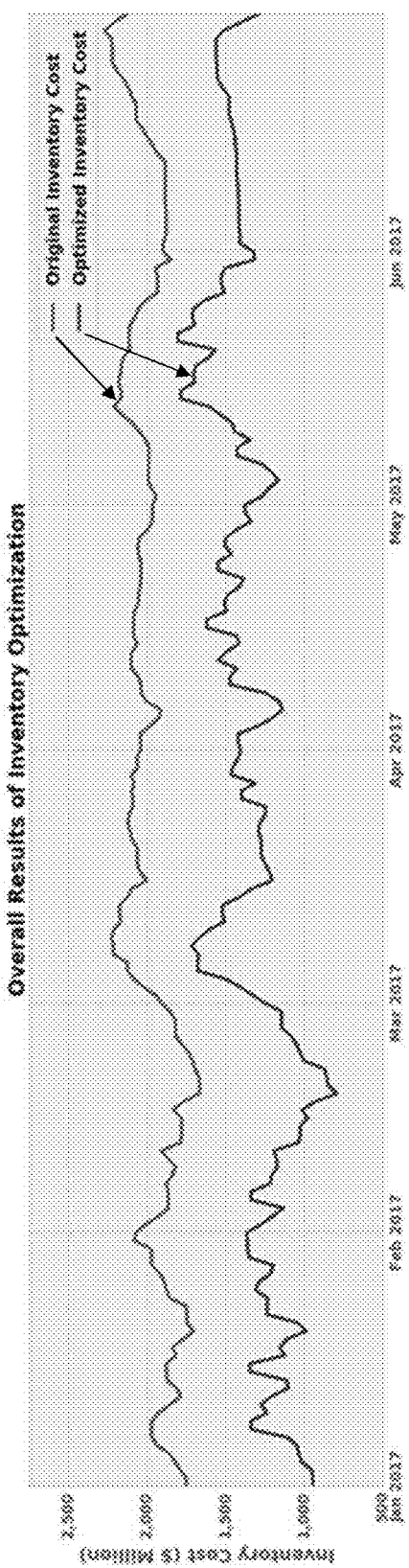
FIG. 6 illustrates an example of overall results in inventory optimization.

FIG. 6 illustrates an example of overall results in inventory optimization over a period of time (e.g., about 6 months). Using systems and methods for inventory management and optimization disclosed herein, the manufacturer reduced inventory costs by about 30% (when comparing an optimized inventory cost relative to an original inventory cost) and realized a total cost savings of hundreds of millions of dollars.

Multi-Echelon Inventory Optimization (MEIO)

Systems and methods for inventory management and optimization may be applied to multi-echelon inventory optimization (MEIO), which generally refers to a problem of optimizing inventory across all nodes in a supply chain. MEIO approaches may optimize the inventories across the network holistically, by leveraging the relationships between nodes in the network. For example, the inventory dataset may comprise inventory variables for either a single-echelon inventory (e.g., corresponding to a single node or facility) or, in the case of MEIO approaches, a multi-echelon inventory (e.g., corresponding to a supply chain with a plurality of nodes or facilities).

MEIO may use approaches similar to those described in previous sections, with certain modifications. These modifications mainly concern describing the connectivity and interactions among facilities in a supply chain.

Statistical Modeling of Uncertainty

The random variables associated with different sources of uncertainties within a supply chain network can be divided into independent and dependent random variables. The independent uncertainty sources can be modeled in a similar fashion as presented above. The dependent sources however, are derived mainly from the independent sources and how the independent sources affect the dependent ones. This dependency structure is commonly encoded using probabilistic graphical models (PGMs), e.g., Bayes or Markov networks depending on the dependency assumptions. The PGM structure is affected by the graph-based representation of the supply network. Having modeled the independent sources of uncertainty, PGM-based inference techniques can be used to predict distributions or statistical properties of the dependent sources of uncertainty.

Prediction of Stochastic Variables and Simulation of Effects on Inventory Management Similar to a single facility case, a simulation module 120 can conduct what-if simulations on a supply chain network comprising multiple facilities. What-if simulations concern what would have happened in a period in the past if something had changed in the inventory management process within the supply chain, e.g., if a larger safety stock in a certain facility had been picketed. During this period we may use a combination of historical entities and/or modeled uncertainty distributions to simulate stochasticity during the simulations. In order to conduct a simulation in a coherent fashion, the structure of a graph (e.g., a directed graph) that represents the supply network can be followed. In one example, assume that replenishment processes or MRPs used at each facility in the supply chain are known. Then starting from the customer facing facilities and based on the demand forecast at those facilities (independent demand), the simulation module 120 can produce "dependent" demands from these facilities to their supplying facilities/nodes. This then propagates through the network until reaching facilities/nodes that are only receiving supplies from facilities external to the supply network. This mimics a backward pass through the network, where facilities create demand for their supplying facilities, given their dependent and independent demand. The simulation module 120 can then conduct a forward pass through the network to simulate supply process in the network. During the forward pass, the simulation module 120 can also simulate uncertainties in the network associated with supply edges in the network and to facilities and their associated independent demand. Repeating this process for every timestep in the simulation period allows us to fully simulate the behavior of the supply chain. Because this process is performed for a period in the past exact realization of certain sources of uncertainties or the uncertainty model outputs can be used for simulating uncertainties in the system."

This process can also be replicated forward in time in a similar fashion, in which the system can rely on the uncertainty models for simulating effects of uncertainty. To be more specific, as an example of such simulation approach one can follow the following procedure.

The simulation module 120 can first conduct a backward pass of the supply chain network as described above. Assuming no uncertainties, all facilities will be able to supply their customer facilities and no facility will face stock-outs. In the case of uncertainties, the simulation module 120 can sample sequences of time and quantity uncertainties from their corresponding predictive distributions. This requires running multiple forward passes through the network and using models for independent uncertainty sources. Specifically conducting forward passes may amount to sampling from the stochastic process defined by the PGMs in the previous section. Each forward pass results in a perturbed inventory profile. This in turn provides an empirical joint distribution of the forward-projected inventory profile. This empirical distribution can then be used, for instance to provide an estimate of obtained future service level given the considered management practices.

The simulation module 120 can also enable computation of forward projections that might happen into the future. That is, assuming knowledge of replenishment processes or MRPs used at each facility in the supply chain, one can simulate what would happen in the future in presence of uncertainties and study the effectiveness of choices of re-order parameters at each time step.

Similarly, the simulation module 120 can quantify the uncertainty associated with placed orders with suppliers (e.g., order that have not reached their due dates) and uncertainty associated with customer orders received by each facility. This can benefit from models discussed in the previous section or may require developing extra models for each connected facility pair. These then enable the operators at each facility to manage the inventory in a more proactive rather than reactive fashion while having information that also incorporates the structure of the supply chain.

Inventory Management and Optimization

Inventory management and optimization in a multi-echelon setting also concerns the three different categories of variables discussed for a single facility.

In order to optimize the variables related to robustness, an optimization module 130 can leverage the simulation methodologies discussed in the previous section. Particularly, the optimization module 130 can evaluate the performance of different combinations of values of the variables under consideration. The optimization module 130 can cause the simulation module 120 to run what-if simulations for a period in the past, forward looking what-if simulations for period in the future, and forward projections of stochastic variables, for example, facilitated through inference techniques provided by the theory of probabilistic graphical models. The probabilistic graphical model may contain a graph with nodes representing facilities and directed edges (i, j) representing that facility i can supply facility j. For example, the probabilistic graphical model can be used to compute optimal scheduled arrivals at any given time t into the future for such a supply chain network, or an optimal safety stock and safety time for each facility in the network.

The probabilistic graphical model can be combined with a data-driven machine learning based training system. The machine learning system may be used to train models to learn how the distribution of random variables change over time and predict the distribution in the future, as described elsewhere herein. The probabilistic graphical model can then be used to propagate information across nodes in the supply chain and to learn the inter-relationships across nodes in the supply chain.

Selecting the variables under consideration at different facilities can be similar to the process described above for single-facility analyses.

The optimization module 130 can use optimization algorithms that do not rely on the simulation approaches. To this end, the optimization module 130 may parametrize a mathematical optimization problem with parameters that include the variables under consideration. This may lead to stochastic MILPs which can leverage the outputs uncertainty models to form stochastic terms of the objective function of the optimization problem or stochastic constraints associated with it, e.g., chance constraints. The cost to optimize may be the inventory holding cost, ordering cost, production or operational costs, sales lost or achieved profits, etc, across the supply chain. The constraints may be or include inventory evolution at each facility, operational constraints within each facility, (e.g., encoding BoM at certain facilities), constraints encoding interactions between facilities in the supply chain, replenishment process constraints and demand satisfaction or management constraints at each facility.

In the event that this problem is prohibitively costly to solve, the optimization module 130 may either decompose the problem and use distributed algorithms for solving the problem or simultaneously solve relaxations (commonly result in stochastic LPs) and restrictions (projection techniques) of these problems. This may enable providing approximate solutions to the problem and may quantify the level of suboptimality of the approximate solution (e.g., how far from the optimal solution the approximate solution is). Given the directed nature of the graph describing the supply chain, the optimization module 130 may also employ approximate dynamic programming to provide approximate solutions to the MILP.

In order to optimize variables concerning interaction among facilities in the supply chain, including orders amounts and timing, the optimization module 130 can implement a direct mathematical optimization approach. This optimization is commonly conducted in case the legacy MRP frameworks that lack the necessary sophistication to handle complexities of interactions among facilities and hence are replaced by this optimization framework. Also, by solving this optimization, the optimization module 130 can set the interaction among facilities with a full view of the supply chain. This may lead to stochastic MILPs which can leverage the outputs from models for uncertainty, to form stochastic terms of the objective function of the optimization problem or stochastic constraints associated to it, e.g., chance constraints. The cost to optimize may be or include inventory holding cost, ordering cost, production or operational costs, sales lost or achieved profits, etc, for the whole supply network. The constraints may be or include inventory evolution at each facility, operational constraints within each facility, replenishment process constraints (any replenishment constraints that are not the target of optimization) between facilities and demand satisfaction or management constraints for each facility. The constraints and terms in the objective function that concern interaction among facilities may clearly encode costs associated with different interaction approaches with between nodes, and the rules associated to these (which are commonly conditional and time varying constraints), e.g., time-varying multi-column pricing, and timing and permission associated with canceling or adding to existing outstanding orders. The optimization formulation may have the necessary flexibility to jointly optimize these variables and those concerning robustness.

If this problem is prohibitively costly to solve, the optimization module 130 may either decompose the problem and use distributed algorithms for solving the problem or simultaneously solve relaxations (commonly result in stochastic LPs) and restrictions (projection techniques) of these problems. This can facilitate providing approximate solutions to the problem, but also to quantify the level suboptimality of the approximate solution. Given the directed nature of the graph describing the supply chain, the optimization module 130 may also employ approximate dynamic programming to provide approximate solutions to the MILP.

The optimization module 130 can also take a direct optimization approach to optimize variables relating to production planning and/or how to satisfy sales orders at different facilities within the supply chain. This may commonly lead to stochastic MILPs which can leverage the outputs from models for uncertainty to form stochastic terms of the objective function of the optimization problem or stochastic constraints associated with it, e.g., chance constraints. The cost to optimize may be inventory holding cost, ordering cost, production or operational costs, sales lost or achieved profits, etc, over the whole supply chain. The constraints may be or include inventory evolution at each facility, operational constraints within each facility, constraints that clearly encode replenishment process framework between facilities, and demand satisfaction or management constraints based on contractual obligations between nodes and with external customers. Such obligations may also be included in the cost function. The constraints and terms in the objective function that concern interaction with the customers may clearly encode costs associated to different interaction approaches with different customers and their associated contractual obligations, which may include hard-coded rules associated with these (which are commonly conditional and time-varying constraints), e.g., time-varying penalty for missed orders or constraints concerning latest possible delivery dates. The constraints may also clearly encode the interactions among equipment involved within the production process at each facility, which may not be simply represented using BoM at each facility. This optimization formulation has the necessary flexibility to jointly optimize these variables and those concerning robustness and/or the ones concerning replenishment process.

In the event that this problem is prohibitively costly to solve, the optimization algorithm may either decompose the problem and use distributed algorithms for solving the problem or simultaneously solve relaxations (commonly result in stochastic LPs) and restrictions (projection techniques) of these problems. This may facilitate providing approximate solutions to the problem, but also to quantify the level suboptimality of the approximate solution Given the directed nature of the graph describing the supply chain, the optimization module 130 may also employ approximate dynamic programming to provide approximate solutions to the MILP.

In the MEIO problem, the underlying supply chain network may define the global graphical structure. The local structure of the graphical model may be defined by the relationship among the various random (e.g., stochastic) variables in the optimization problem, such as inventory, demand forecast, material movements, supplier orders, etc. Such random variables may have stochastic distributions which may be typically time-varying.

The multi-echelon inventory optimization (MEIO) can be performed by applying an inventory optimization approach for a single facility to every facility in the network. For example, every facility, having observed its historical suppliers' behavior, uncertainty over its demand forecast and other miscellaneous behavior at the facility, can optimize its safety stock and safety time in isolation from other facilities in the network.

In some embodiments, the MEIO problem may comprise modeling the supply chain network and optimizing the inventory variables using Bayesian optimization. For example, optimal safety stock and safety time values may be determined for each facility by jointly optimizing quantity and time uncertainties for all facilities in the network. Safety stock may be an additional quantity of an item held by a company in inventory in order to reduce the risk that the item will be out of stock. Safety time may be time buffer for covering product requirements in case of future late deliveries. A grid of possible order parameter values can be created across the nodes in the supply chain, and the system can be simulated with each combination to compute the cost and service level. The system can be optimized to obtain an optimal combination of parameters, such as by performing an exhaustive grid search or a random search. However, such approaches can be expensive. As an example, if each node in the supply chain network with N nodes takes 10 possible values for the order parameters, then the total number of possible combinations to search over is $10^N$. The list of total combinations can quickly get prohibitively large to evaluate and find the optimal combination.

Alternatively, Bayesian optimization may be used to obtain the optimal combination of parameters, with decreased computational complexity. Bayesian optimization may refer to a sequential technique that suggests the next best combination to evaluate given all the prior combinations evaluated. Applying Bayesian optimization may enable computation of optimal combinations by visiting only a subset of the grid points of parameter values. Such an approach may be advantageous and enable such benefits such as using Gaussian process models as the underlying models, using probabilistically meaningful acquisition functions that provide probabilistic guarantees concerning quality of the solution, using the evaluated data points from the previous optimization run for the current time by modifying the used kernel appropriately, and setting a computational time or resources budget for the optimization and interrupting safely if the computational time or resources budget is surpassed. The computational complexity of the Bayesian optimization approach can be expected, in the very worst case, to be exponential with respect to the number of facilities in the network.

Computer Systems

Figure 7:
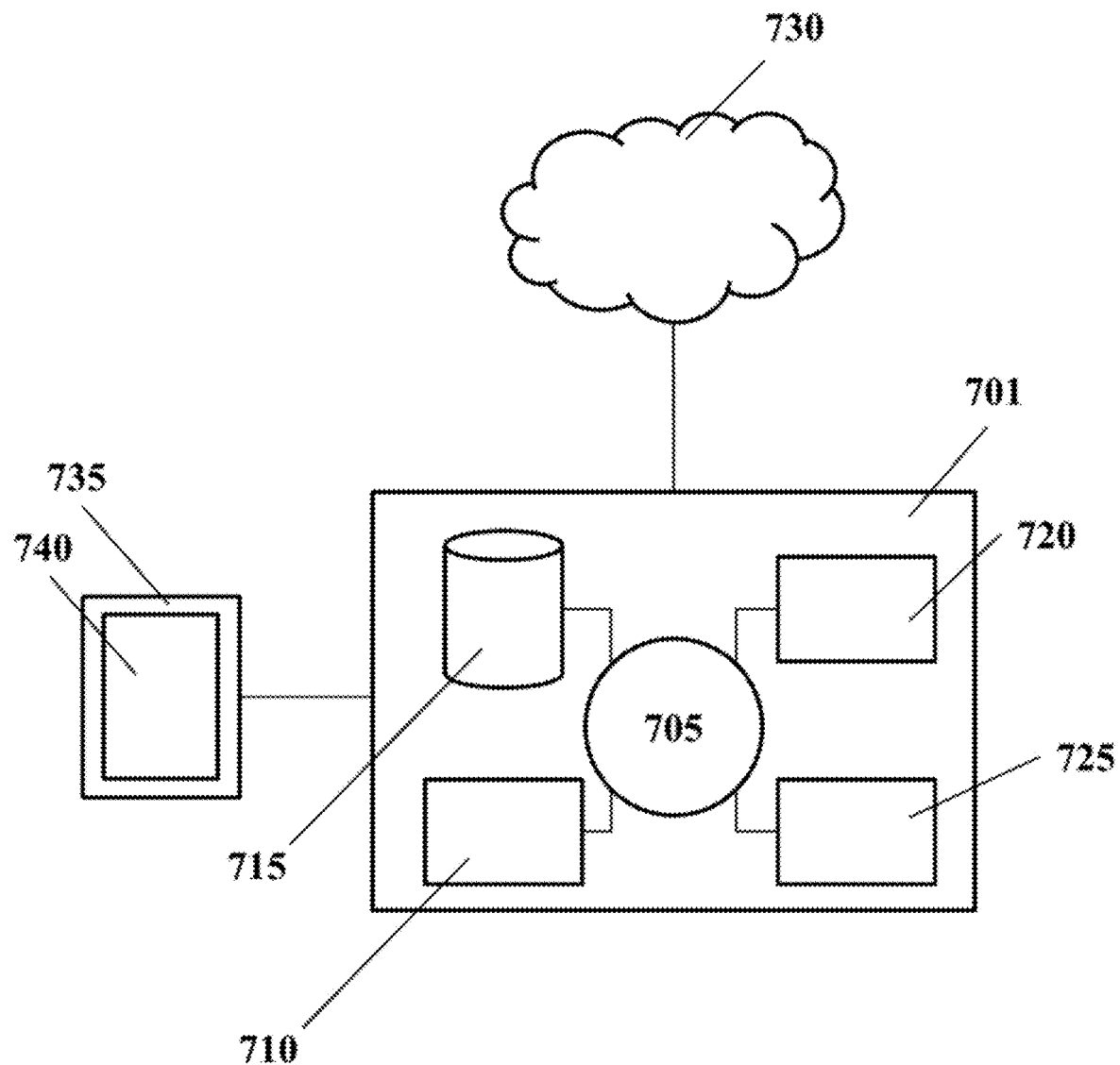
FIG. 7 shows a computer system that is programmed or otherwise configured to implement methods provided herein.

The present disclosure provides computer systems that are programmed to implement methods of the disclosure. FIG. 7 shows a computer system 701 that is programmed or otherwise configured to implement methods provided herein.

The computer system 701 can regulate various aspects of the present disclosure, such as, for example, obtaining an inventory dataset comprising a plurality of inventory variables, applying a trained algorithm to the inventory dataset to generate a prediction of the variables having future uncertainty, and applying an optimization algorithm to the inventory dataset to optimize the plurality of inventory variables. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet.

The network 730 in some cases is a telecommunication and/or data network. The network 730 can include one or more computer servers, which can enable distributed computing, such as cloud computing. For example, one or more computer servers may enable cloud computing over the network 730 ("the cloud") to perform various aspects of analysis, calculation, and generation of the present disclosure, such as, for example, obtaining an inventory dataset comprising a plurality of inventory variables, applying a trained algorithm to the inventory dataset to generate a prediction of the variables having future uncertainty, and applying an optimization algorithm to the inventory dataset to optimize the plurality of inventory variables. Such cloud computing may be provided by cloud computing platforms such as, for example, Amazon Web Services (AWS), Microsoft Azure, Google Cloud Platform, and IBM cloud. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740. Examples of user interfaces (UIs) include, without limitation, a graphical user interface (GUI) and web-based user interface. For example, the computer system can include a web-based dashboard (e.g., a GUI) configured to display, for example, a BOM to a user.

Methods and systems of the present disclosure can be implemented by way of one or more algorithms. An algorithm can be implemented by way of software upon execution by the central processing unit 705. The algorithm can, for example, obtain an inventory dataset comprising a plurality of inventory variables, apply a trained algorithm to the inventory dataset to generate a prediction of the variables having future uncertainty, and apply an optimization algorithm to the inventory dataset to optimize the plurality of inventory variables.

Although the description has been described with respect to particular embodiments thereof, these particular embodiments are merely illustrative, and not restrictive. Concepts illustrated in the examples may be applied to other examples and implementations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system comprising one or more computers and one or more storage devices having instructions stored thereon that are operable, when executed by the one or more computers, to cause the one or more computers to perform operations comprising:

receiving, by one or more processors, an inventory dataset comprising a plurality of inventory variables that indicate at least historical values of inventory variables;

processing, by the one or more processors, the inventory dataset using a trained machine learning model to predict statistical distributions of future values of the plurality of inventory variables, wherein the trained machine learning model is trained using historical inventory datasets, and wherein the predicted statistical distributions reflect uncertainties of the future values of the plurality of inventory variables;

simulating effects of the uncertainties of the future values of the plurality of inventory variables;

applying, by the one or more processors, an optimization algorithm to at least the predicted statistical distributions of future values of the plurality of inventory variables to predict one or more inventory management parameters that achieve a service level constraint, while minimizing a cost function or maximizing a reward function, wherein the optimization algorithm comprises one or more constraint conditions, wherein the inventory management parameters comprise a timing and quantity of orders to be placed with suppliers, and wherein the optimization algorithm leverages the simulating of the effects of the uncertainties of the future values of the plurality of inventory variables; and re-training, by the one or more processors, the trained machine learning model using updated data that includes additional data not used during prior training of the trained machine learning model in response to determining reduced performance for predictions over a planning horizon associated with the trained machine learning model, wherein the planning horizon dynamically changes based on the updated data.

2. The system of claim 1, wherein the operations further comprise:
applying, by the one or more processors, the optimization algorithm to a current inventory level and a quantity of current supplier orders to predict the one or more inventory management parameters.

3. The system of claim 2, wherein the operations further comprise:
generating, by the one or more processors, an inventory management recommendation based at least in part on the predicted future values of the plurality of inventory variables or the predicted one or more inventory management parameters.

4. The system of claim 3, wherein the inventory management recommendation comprises a recommendation to increase or decrease a future inventory level relative to the current inventory level.

5. The system of claim 3, wherein the inventory management recommendation is generated in real time, substantially real-time, or just-in-time.

6. The system of claim 1, wherein the one or more constraint conditions comprise a requirement for a target service level to satisfy a present, incoming, or expected demand requirement, and wherein the operations further comprise:
computing the present, incoming, or expected demand requirement using forecasted demand for finished products and a bill of materials (BOM) for the finished products.

7. The system of claim 6, wherein the BOM comprises a dynamic hierarchical graph.

8. The system of claim 1, wherein the inventory dataset is received from a plurality of disparate sources selected from the group consisting of smart devices, sensors, enterprise systems, extraprise, and Internet sources.

9. The system of claim 1, wherein the plurality of inventory variables further comprises one or more inventory movements selected from the group consisting of arrival movements, consumption movements, blocked movements, and inter-factory movements.

10. The system of claim 1, wherein the plurality of inventory variables further comprises one or more of a demand forecast, a material consumption, a transit time, and a shipping cost.

11. The system of claim 1, wherein the trained machine learning model is selected from the group consisting of a support vector machine (SVM), a naive Bayes classifier, a linear regression model, a quantile regression model, a logistic regression model, a random forest model, a neural network, a Gaussian process, and a Dirichlet processes.

12. The system of claim 1, wherein the statistical distribution is a parametric distribution comprising one or more statistical parameters selected from the group consisting of a median, a mean, a mode, a variance, a standard deviation, a quantile, a measure of central tendency, a measure of variance, a range, a minimum, a maximum, an interquartile range, and a percentile.

13. The system of claim 1, wherein the statistical distribution is a parametric distribution selected from the group consisting of a Gaussian distribution, a Gamma distribution, and a Poisson distribution.

14. The system of claim 1, wherein the optimization algorithm minimizes the cost function.

15. The system of claim 1, wherein one or more constraint conditions comprise a member selected from the group consisting of an inventory constraint, a service level constraint, an arrival window constraint, an order size constraint, and an ordering window constraint.

16. The system of claim 1, wherein the optimization algorithm comprises a stochastic constrained optimization algorithm.

17. The system of claim 16, wherein the stochastic constrained optimization algorithm comprises a mixed integer linear programming (MILP) problem.

18. The system of claim 1, wherein the optimization algorithm comprises a technique selected from the group consisting of a grid search, a random search, and a Bayesian optimization search.

19. The system of claim 1, wherein the inventory dataset comprises a plurality of inventory variables for a single-echelon inventory, and wherein the single-echelon inventory corresponds to a single node or facility.

20. The system of claim 1, wherein the optimization algorithm is configured to perform multi-echelon inventory optimization (MEIO), wherein the inventory dataset comprises a plurality of inventory variables for a multi-echelon inventory, and wherein the multi-echelon inventory corresponds to a supply chain network comprising a plurality of nodes or facilities.

21. The system of claim 20, wherein the optimization algorithm is configured to model the plurality of inventory variables using a probabilistic graphical model of the supply chain network.

22. The system of claim 20, wherein the optimization algorithm is configured to search for parameters of interest concerning the supply chain network using Bayesian optimization.

23. The system of claim 1, wherein the optimization algorithm maximizes a product output.

24. The system of claim 1, wherein the optimization algorithm maximizes a profit.

25. The system of claim 1, further comprising using one or more inventory management parameters to predict future supply and demand behavior and future service level from the inventory dataset, thereby improving inventory management.

26. The system of claim 1, wherein the historical values of inventory variables comprise inventory levels, inventory holding costs, supplier orders, or lead times over time.

27. The system of claim 1, wherein the operations further comprise generating an alert of an inventory disruption risk or an inventory delay risk based at least in part on the predicted one or more inventory management parameters.

28. The system of claim 1, wherein the service level constraint comprises one or more reorder parameters defined by a manufacturer, a supplier, a customer, or a combination thereof.

29. The system of claim 1, wherein the updated data includes incremental data that was not part of a historical dataset used during prior training of the trained machine learning model.

30. The system of claim 29, wherein re-training the trained machine learning model comprises weighting the updated data higher than the historical dataset.

31. The system of claim 1, wherein determining that the trained machine learning model exhibits reduced performance comprises detecting that a prediction accuracy metric associated with the future values of the plurality of inventory variables has dropped below a predefined threshold during the planning horizon.

32. The system of claim 1, wherein the planning horizon is shortened each time the model performance meets or exceeds a predefined error threshold, and is expanded back to a default horizon if the error threshold remains below that predefined level for a specified duration.

33. A method comprising:
receiving, by one or more processors, an inventory dataset comprising a plurality of inventory variables that indicate at least historical values of inventory variables;
processing, by the one or more processors, the inventory dataset using a trained machine learning model to predict statistical distributions of future values of the plurality of inventory variables, wherein the trained machine learning model is trained using historical inventory datasets, and wherein the predicted statistical distributions reflect uncertainties of the future values of the plurality of inventory variables;
simulating effects of the uncertainties of the future values of the plurality of inventory variables;
applying, by the one or more processors, an optimization algorithm to at least the predicted future values of the plurality of inventory variables to predict one or more inventory management parameters that achieve a service level constraint, while minimizing a cost function or maximizing a reward function, wherein the optimization algorithm comprises one or more constraint conditions, wherein the inventory management parameters comprise a timing and quantity of orders to be placed with suppliers, and wherein the optimization algorithm leverages the simulating of the effects of the uncertainties of the future values of the plurality of inventory variables; and
re-training, by the one or more processors, the trained machine learning model using updated data that includes additional data not used during prior training of the trained machine learning model in response to determining reduced performance for predictions over a planning horizon associated with the trained machine learning model, wherein the planning horizon dynamically changes based on the updated data.

34. A non-transitory computer-readable storage medium storing machine-executable instructions that are operable, when executed by one or more computer processors, to cause the one or more computer processors to perform operations comprising:
receiving, by one or more processors, an inventory dataset comprising a plurality of inventory variables that indicate at least historical values of inventory variables, wherein the plurality of inventory variables are characterized by having future values with uncertainty levels;
processing, by the one or more processors, the inventory dataset using a trained machine learning model to predict statistical distributions of future values of the plurality of inventory variables, wherein the trained machine learning model is trained using historical inventory datasets, and wherein the predicted statistical distributions reflect uncertainties of the future values of the plurality of inventory variables;
simulating effects of the uncertainties of the future values of the plurality of inventory variables;
applying, by the one or more processors, an optimization algorithm to at least the predicted future values of the plurality of inventory variables to predict one or more inventory management parameters that achieve a service level constraint, while minimizing a cost function or maximizing a reward function, wherein the optimization algorithm comprises one or more constraint conditions, wherein the inventory management parameters comprise a timing and quantity of orders to be placed with suppliers, and wherein the optimization algorithm leverages the simulating of the effects of the uncertainties of the future values of the plurality of inventory variables; and
re-training, by the one or more processors, the trained machine learning model using updated data that includes additional data not used during prior training of the trained machine learning model in response to determining reduced performance for predictions over a planning horizon associated with the trained machine learning model, wherein the planning horizon dynamically changes based on the updated data.

* * * * *